US012650129B2

(12) United States Patent
Lee et al.

(10) Patent No.: US 12,650,129 B2
(45) Date of Patent: Jun. 9, 2026

(54) BLOWER

(71) Applicant: LG ELECTRONICS INC., Seoul (KR)

(72) Inventors: Kunyoung Lee, Seoul (KR); Hyunpil Ha, Seoul (KR); Sangkyun Baek, Seoul (KR); Myungjin Ku, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 641 days.

(21) Appl. No.: 17/900,050

(22) Filed: Aug. 31, 2022

(65) Prior Publication Data

US 2023/0067624 A1 Mar. 2, 2023

(30) Foreign Application Priority Data

Sep. 1, 2021 (KR) ........................ 10-2021-0116551

(51) Int. Cl.
*F04D 25/06* (2006.01)
*F04D 17/06* (2006.01)
(Continued)

(52) U.S. Cl.
CPC ......... *F04D 25/0693* (2013.01); *F04D 17/06* (2013.01); *F04D 25/105* (2013.01);
(Continued)

(58) Field of Classification Search
CPC ...... F04D 17/06; F04D 25/0693; F04D 25/10; F04D 25/105; F04D 29/056;
(Continued)

(56) References Cited

U.S. PATENT DOCUMENTS

2006/0045742 A1* 3/2006 Ngan ...................... F04D 25/10 416/100
2014/0186197 A1* 7/2014 Owusu ................ F04D 25/0693 417/326

(Continued)

FOREIGN PATENT DOCUMENTS

CN 202692241 U * 1/2013
CN 211648561 * 10/2020

(Continued)

OTHER PUBLICATIONS

Korean Office Action dated Jan. 7, 2023 issued in Application No. 10-2021-0116551.

(Continued)

*Primary Examiner* — Charles G Freay
*Assistant Examiner* — Joseph S. Herrmann
(74) *Attorney, Agent, or Firm* — KED & ASSOCIATES, LLP

(57) ABSTRACT

A blower includes: a base; a case disposed above the base and provided with an inlet and an outlet; a rotating plate disposed below the case and rotatably disposed on the base; an electric wire whose part is exposed to an outside of the base and the other part extends upwards of the rotating plate through the base; and an electric wire holder including an electric wire holder that is fixedly disposed on the rotating plate and fixes one side of the electric wire extending towards of the rotating plate from an inside of the base, in which the base includes an electric wire fixing protrusion that fixes the other side of the electric wire extending from an outside to an inner space of the base and an electric wire (Continued)

guide rib that fixes a partial arrangement of the electric wires whose arrangement is changed in an inner space of the base according to a movement of the rotating plate.

16 Claims, 25 Drawing Sheets

(51) Int. Cl.

| | |
|---|---|
| ***F04D 25/10*** | (2006.01) |
| ***F04D 29/42*** | (2006.01) |
| ***F04D 29/62*** | (2006.01) |
| *F04F 5/16* | (2006.01) |

(52) U.S. Cl.
CPC ....... *F04D 29/4226* (2013.01); *F04D 29/624* (2013.01); *F04F 5/16* (2013.01); *F05D 2250/411* (2013.01)

(58) Field of Classification Search
CPC .. F04D 29/403; F04D 29/4226; F04D 29/601; F04D 29/624; F04F 5/16; F05D 2250/411; F05D 2260/30
See application file for complete search history.

(56) References Cited

U.S. PATENT DOCUMENTS

2015/0294768 A1* 10/2015 Sakaki ..................... H01B 7/16
174/72 A
2020/0208871 A1* 7/2020 Yamamoto ............ F04D 29/545

FOREIGN PATENT DOCUMENTS

| | | | |
|---|---|---|---|
| CN | 212615540 | | 2/2021 |
| JP | H06330889 | * | 11/1994 |
| KR | 10-1370267 | | 3/2014 |
| KR | 10-2017-0141395 | | 12/2017 |
| KR | 10-2020-0043737 | | 4/2020 |

OTHER PUBLICATIONS

European Search Report dated Jan. 27, 2023 issued in Application No. 22193322.9.

* cited by examiner

BLOWER

CROSS-REFERENCE TO RELATED APPLICATION(S)

This application claims priority under 35 U.S.C. § 119 to Korean Application No. 10-2021-0116551 filed in Korea on Sep. 1, 2021, whose entire disclosure is hereby incorporated by reference.

BACKGROUND

1. Field

The present disclosure relates to a blower, and more particularly, to a blower in which a case disposed above a base rotates about the base.

2. Background

A blower is a device that includes a mechanism, such as a fan, that supplies air to a local area. In order to adjust a wind direction of air discharged from the blower, a main body of the blower may rotate to move the mechanism or to move a guide that adjusts an air flow from the mechanism, and the blower may include a bearing for supporting the rotation of the main body. As for the blower, a structure above the base may rotate relative to the base disposed on the ground. In this case, a motor for rotating the blower may be mounted on the base to rotate the upper structure.

Korean Patent No. 10-1370267 discloses a structure in which a motor is disposed on a base and a structure disposed above the base rotates. In this structure, when a printed circuit board (PCB) for controlling an operation of the motor is separately disposed on the base, and the internal structure of the base may be undesirably large to accommodate the motor and the PCB. Alternatively, when a printed circuit board for operating a fan is disposed above the base, an additional printed circuit board for operating the motor may be disposed inside the base. In addition, when the printed circuit board is disposed on an upper structure of the base, electric wires connected to the motor may become twisted during the rotation of the structure above the base.

For the stable rotation of the blower, when an electronically controlled device is disposed on the structure above the base, the arrangement of the electric wires inside the base may be changed. In such a structure, unintended contact between the electric wires or twisting of the electric wires may occur when an arrangement of the electric wires is changed inside the base. The twisting of the electric wires or the contact between the electric wires may cause malfunction of the blower.

BRIEF DESCRIPTION OF THE DRAWINGS

Embodiments will be described in detail with reference to the following drawings in which like reference numerals refer to like elements, and wherein:

FIGS. 19A and 19B are diagrams for disclosing an arrangement of electric wires arranged inside the base according to a rotation of the rotating plate of the present disclosure, in which FIG. 19A is a diagram illustrating an arrangement of electric wires at a first position P1 and FIG. 19B is a diagram illustrating an arrangement of electric wires at a second position P2;

DETAILED DESCRIPTION

Figure 1:
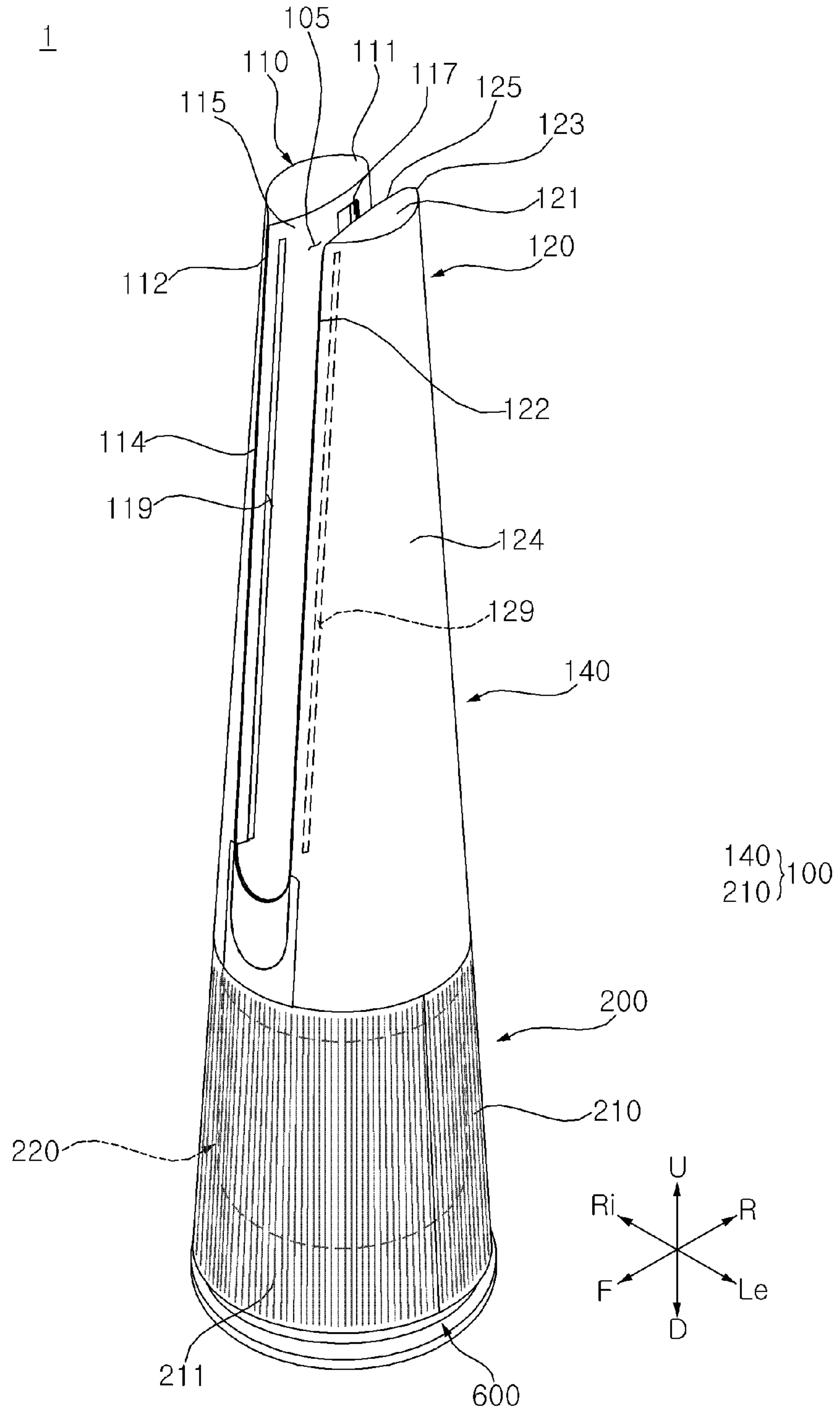
FIG. 1 is a perspective view of an air clean fan according to an embodiment of the present disclosure.

Various advantages and features of the present disclosure and methods accomplishing them will become apparent from the following description of embodiments with reference to the accompanying drawings. However, the present disclosure is not limited to the embodiments disclosed herein, but will be implemented in various forms. The embodiments make contents of the present disclosure thorough and are provided so that those skilled in the art can easily understand the scope of the present disclosure. Therefore, the present disclosure will be defined by the scope of the appended claims. Throughout the specification, like reference numerals denote like elements. Hereinafter, the present disclosure will be described with reference to drawings for describing a blower according to embodiments of the present disclosure.

An overall structure of a blower 1 will be first described with reference to FIGS. 1 to 5. The blower 1 according to an embodiment of the present disclosure includes a case 100 that provides an appearance. The case 100 includes a lower case 210 in which a filter 220 is installed, and a tower case 140 that discharges air through the Coandă effect, a tendency of air or other fluid emerging from an opening to flow along a curved surface adjacent to the opening.

The tower case 140 includes a first tower 110 and a second tower 120 that are separated in the form of two pillars and are spaced apart from each other. Referring to FIG. 1, the first tower 110 may be disposed on the left side, and the second tower 120 may be disposed on the right side.

The first tower 110 and the second tower 120 are spaced apart from each other to form a blowing space 105 between the first tower 110 and the second tower 120. The front, rear, and upper regions of the blowing space 105 may be open, and the upper and lower left and right intervals of the blowing space 105 may be formed to be substantially the same.

The tower case 140 including the first tower 110, the second tower 120, and the blowing space 105 may have a truncated cone shape. Outlets 117 and 127 respectively formed in the first tower 110 and the second tower 120 may discharge air to the blowing space 105. To distinguish the outlets in the present disclosure, the outlet formed in the first tower 110 may be referred to as a first outlet 117, and the outlet formed in the second tower 120 may be referred to as a second outlet 127.

The first outlet 117 and the second outlet 127 may extend in an up-down direction in the blowing space 105, and a direction crossing the blowing space 105 may be defined as an air discharge direction. Since the first tower 110 and the second tower 120 are disposed in a left-right direction, the air discharge direction may be formed in a front-rear direction. That is, the air discharging direction crossing the blowing space 105 may be defined as a first air discharging direction S1 formed in a horizontal direction.

In addition, according to the movement of a Coandă breaker 400 to be described later (see FIG. 9), the air discharge direction passing through the blowing space 105 may be formed in the up-down direction. In this case, the air discharging direction crossing the blowing space 105 may be defined as a second air discharging direction S2 formed in the up-down direction.

The air flowing in the first air discharging direction S1 is referred to as a horizontal airflow, and the air flowing in the second air discharging direction S2 is referred to as an upward airflow. It should be understood that the horizontal airflow does not mean that airflows only in a horizontal direction, but means that a flow rate of air flowing in a horizontal direction is greater. Likewise, it should be understood that the upward airflow does not mean that airflows only in an upward direction, but means that a flow rate of air flowing in an upward direction is greater.

An upper gap and a lower gap of the blowing space 105 may be formed to be substantially the same in one implementation. However, in another implementation, the upper gap of the blowing space 105 may be formed to be narrower or wider than the lower gap of the blowing space 105.

By forming left and right widths of the blowing space 105 uniformly, the flow of air flowing in the front of the blowing space 105 may be formed more uniformly. For example, when the width of the upper side is different from the width of the lower side, a flow velocity of the wide side may be formed low, and a deviation of the velocity may be generated based on the vertical direction. When the deviation of the airflow velocity occurs in the vertical direction, the supply amount of clean air may vary depending on the location in the up-down direction where the air is discharged.

The air discharged from the first outlet 117 and the second outlet 127 may be joined in the blowing space 105 and then supplied to a user after. That is, the air discharged from the first outlet 117 and the air discharged from the second outlet 127 do not individually flow to the user, but are joined in the blowing space 105 and then supplied to the user.

The blowing space 105 may be used as a space in which the discharge air is joined and mixed. In addition, the air behind the blowing space 105 may also flow into the blowing space 105 by the air discharged to the blowing space 105.

Since the discharge air of the first outlet 117 and the discharge air of the second outlet 127 are joined in the blowing space 105, the straightness of the discharge air may be improved. In addition, by joining the discharge air of the first outlet 117 and the discharge air of the second outlet 127 in the blowing space 105, the air around the first tower 110 and the second tower 120 may also be induced to flow along the air discharge direction.

Figure 2:
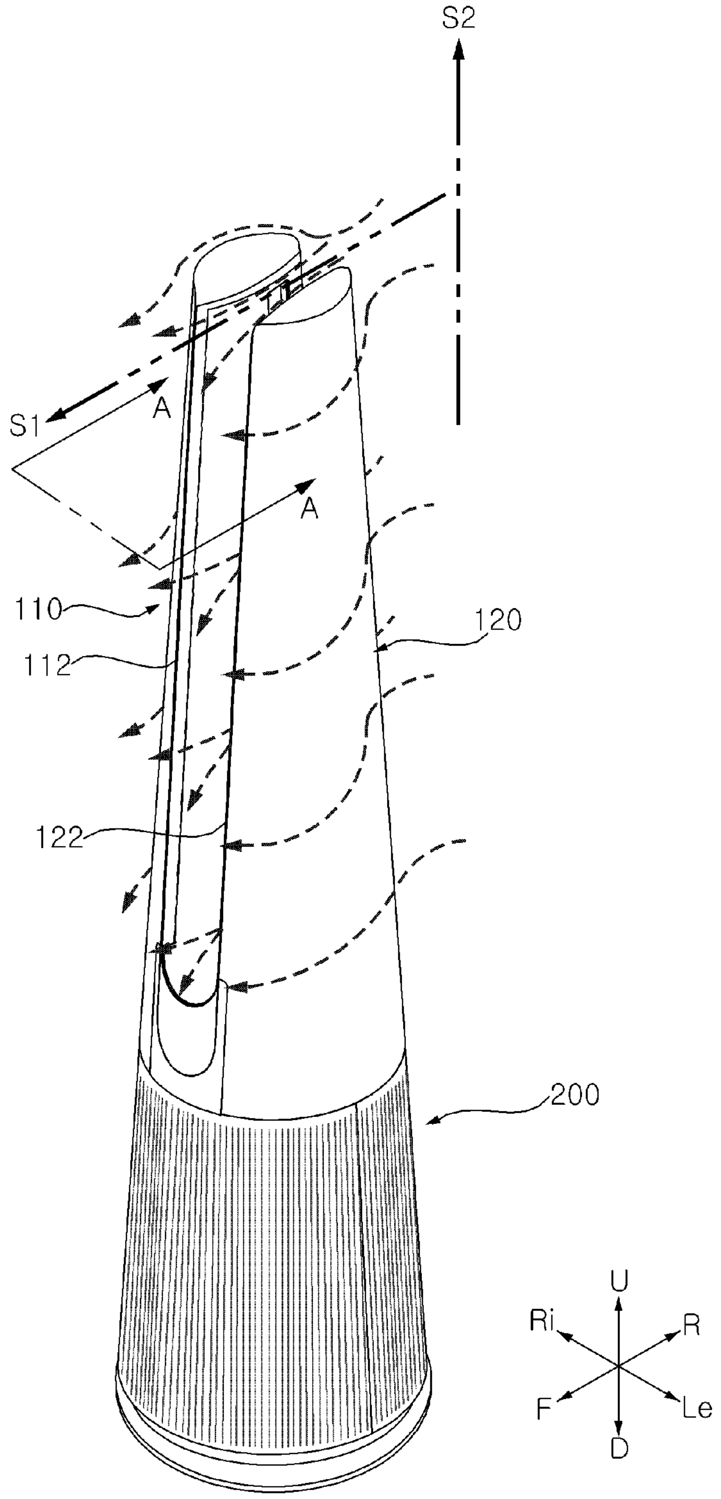
FIG. 2 is a diagram illustrating operation example 1 of FIG. 1.
Figure 3:
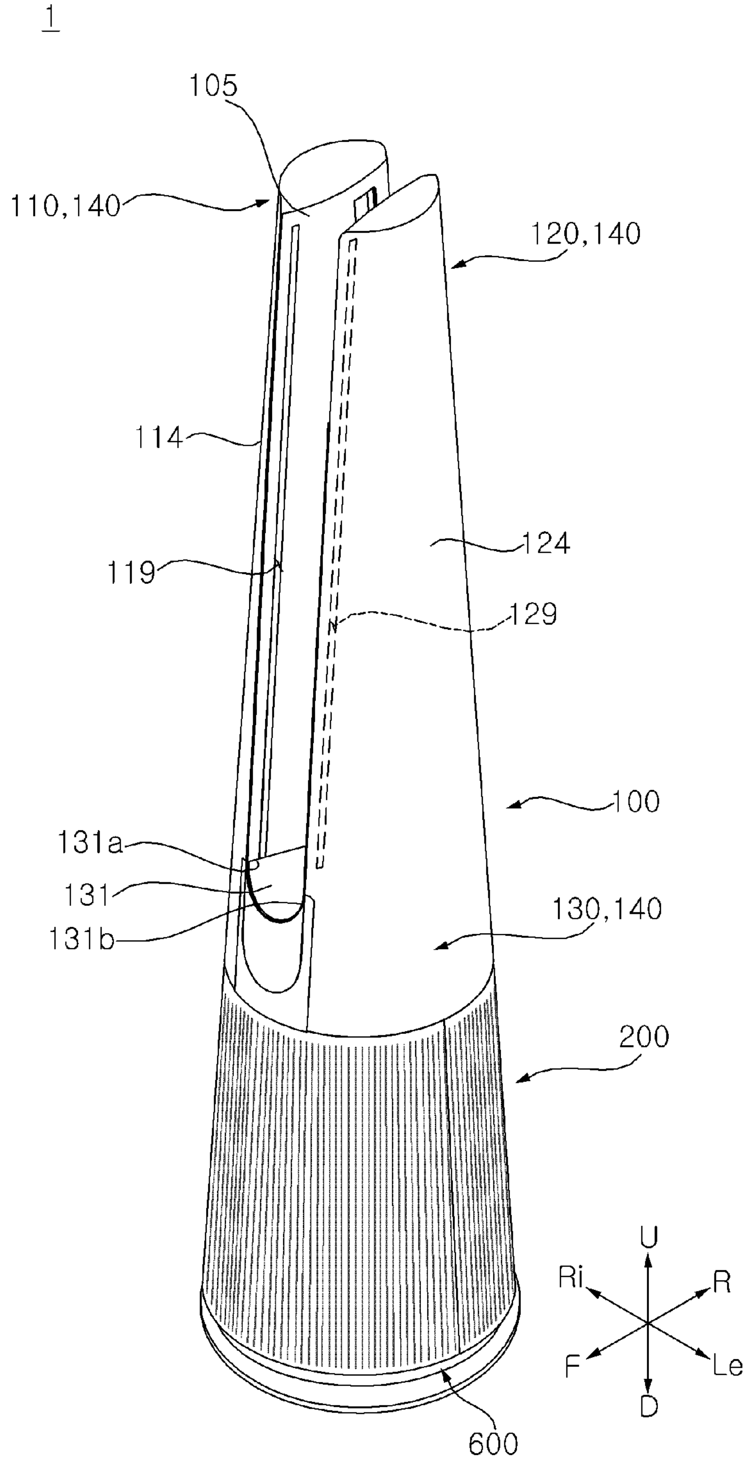
FIG. 3 is a diagram illustrating operation example 2 of FIG. 1.
Figure 4:
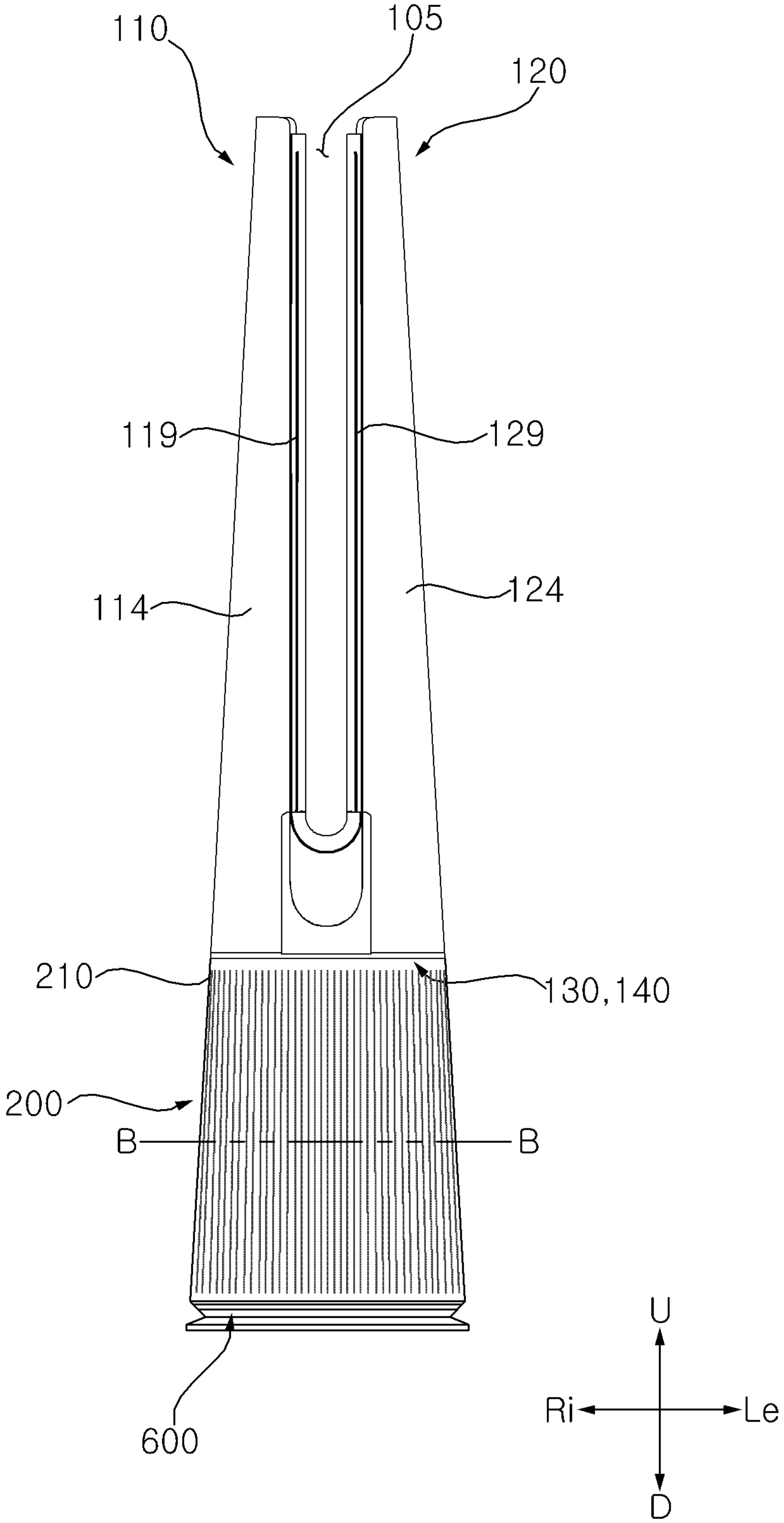
FIG. 4 is a front view of FIG. 1.

Referring to FIG. 2, the first air discharging direction S1 is formed from the rear to the front, and the second air discharging direction S2 is formed from the lower side to the upper side. In order to form the second air discharging direction S2, an upper side end 111 of the first tower 110 and an upper side end 121 of the second tower 120 may be spaced apart from each other in the left-right direction. For example, the air discharged in the second air discharging direction S2 does not interfere with the case 100 of the blower 1.

In order to form the first air discharging direction S1, a front end 112 of the first tower 110 and a front end 122 of the second tower 120 may be spaced apart from each other in the left-right direction, and a rear end 113 of the first tower 110 and a rear end 123 of the second tower 120 are also spaced apart from each other in the left-right direction. A surface facing the blowing space 105 in the first tower 110 and the second tower 120 may be called an inner side surface, and a surface not facing the blowing space 105 may be defined as an outer side surface.

An outer side wall 114 of the first tower 110 and an outer side wall 124 of the second tower 120 may be disposed to face each other, and an inner side wall 115 of the first tower 110 and an inner side wall 125 of the second tower 120 may be formed to face each other. In the present disclosure, the inner side surface of the first tower 110 may be defined as the first inner side wall 115, and the inner side surface of the second tower 120 may be defined as the second inner side wall 125. Similarly, the outer side surface of the first tower 110 may be defined as the first outer side wall 114, and the outer side surface of the second tower 120 may be defined as the second outer side wall 124.

The first tower 110 and the second tower 120 may be formed in a streamlined shape with respect to the flow direction of the air. For example, the first inner side wall 115 and the first outer side wall 114 may be formed in the streamlined shape with respect to the front-rear direction, and the second inner side wall 125 and the second outer side wall 124 may be formed in the streamlined shape with respect to the front-rear direction. The first outlet 117 is formed on the first inner side wall 115, and the second outlet 127 is formed on the second inner side wall 125.

A shortest distance between the first inner side wall 115 and the second inner side wall 125 may be defined as B0. The outlets 117 and 127 may be located on the rear side of the shortest distance B0.

A separation distance between the front end 112 of the first tower 110 and the front end 122 of the second tower 120 may be defined as a first separation distance B1, and a separation distance between the rear end 113 of the first tower 110 and the rear end 123 of the second tower 120 is defined as a second separation distance B2. In one example, the first separation distance B1 and the second separation distance B2 may be formed to be the same. In another example, the length of one of the first separation distance B1 or the second separation distance B2 may be formed longer than the length of another one of the first separation distance B1 or the second separation distance B2.

The first outlet 117 and the second outlet 127 may be formed between a position where the shortest distance B0 is formed and a position where the second separation distance B2 is formed. The first outlet 117 and the second outlet 127 may be formed at a position closer to the rear end 113 of the first tower 110 and the rear end 123 of the second tower 120 than the position where the shortest distance B0 is formed. The closer the outlets 117 and 127 are to the rear ends 113 and 123, the easier it may be to control the airflow through the Coandă effect, which will be described later.

The inner side wall 115 of the first tower 110 and the inner side wall 125 of the second tower 120 may directly provide the Coandă effect, and the outer side wall 114 of the first tower 110 and the outer side wall 124 of the second tower 120 may indirectly provide the Coandă effect. For example, the inner side walls 115 and 125 may directly guide the air discharged from the outlets 117 and 127 to the front ends 112 and 122. For example, the inner side walls 115 and 125 may induce the air discharged from the outlets 117 and 127 to form the horizontal airflow.

The indirect flow of air may also generated in the outer side walls 114 and 124 due to the formation of the horizontal airflow due to the Coandă effect generated in the blowing space 105. The outer side walls 114 and 124 may induce the Coandă effect for the above-described indirect flow of air, and may guide the above-described indirect airflow to the front ends 112 and 122.

A Coandă breaker 400, to be described later, may convert the horizontal airflow passing through the blowing space 105 into the upward airflow, and the upward airflow may flow to an open upper side of the blowing space 105. The upward airflow may prevent the discharge air from directly flowing to the user and activate convection of the indoor air. In addition, the flow rate of the discharged air blown from the blower 1 may be adjusted by adjusting the width at which the air joined in the blowing space 105 is discharged.

Figure 9:
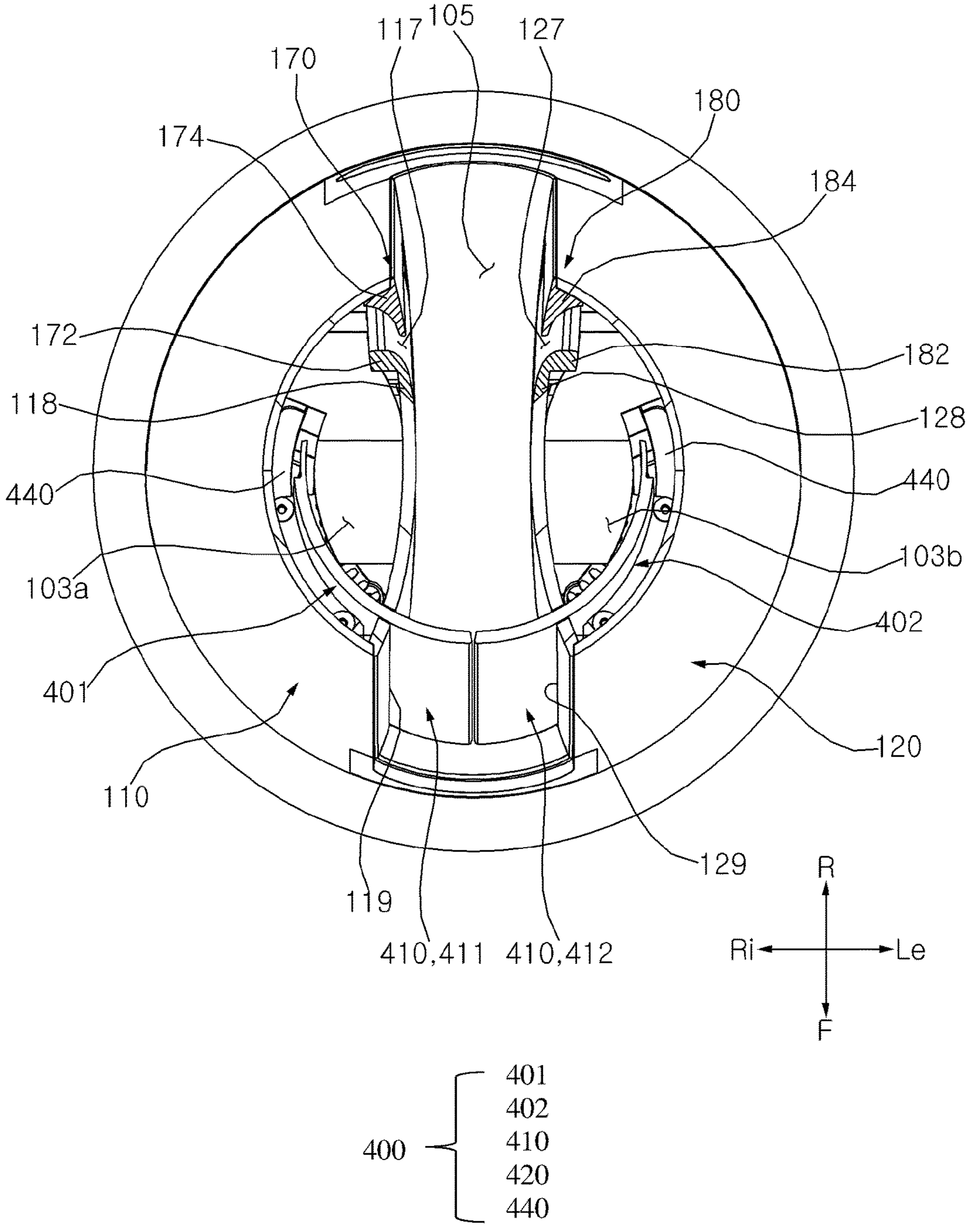
FIG. 9 is a plan view of a cross section taken along line A-A of FIG. 2.

A first board slit 119 to which the Coandă breaker 400 moves may be formed in the first tower 110 to extend in the up-down direction, and a second board slit 129 to which the Coandă breaker 400 moves may be formed in the second tower 120 to extend in the up-down direction (see FIG. 9). The board slits 119 and 129 may be formed on the inner side walls 115 and 125, respectively, and may be formed to be open toward the inner space of the towers 110 and 120. The board slits 119 and 129 may be formed at a position closer to the front end 112 of the first tower 110 and the front end 122 of the second tower 120 than the position where the shortest distance B0 is formed. By forming the upper and lower lengths of the first outlet 117 and the second outlet 127 longer than the left and right widths B0, B1, and B2 of the blowing space 105, the discharge air of the first outlet 117 and the discharge air of the second outlet 127 may be induced to be joined in the blowing space 105.

The case 100 of the blower 1 may include a lower case 210 having a filter 220 disposed therein, and a tower case 140 disposed above the lower case 210 and supported by the lower case 210. The lower case 210 may form an appearance of the blowing unit 200 including a series of devices for sucking in the outside air and blowing the sucked outside air upward.

The tower case 140 may form the appearance of the first tower 110 and the second tower 120. The tower case 140 may include a tower base 130 connecting the first tower 110 and the second tower 120, and the tower base 130 may be assembled to the lower case 210. The tower base 130 may be manufactured integrally with the first tower 110 and the second tower 120. In other examples, the first tower 110 and the second tower 120 may be directly assembled to the lower case 210 without the tower base 130, or may be integrally manufactured with the lower case 210.

The lower case 210 may form a lower portion of the blower 1, and the tower case 140 may form an upper portion of the blower 1. A filter 220 for filtering out foreign substances contained in the air introduced through an air inlet 211 formed along an outer circumferential surface of the lower case 210 may be disposed inside the lower case 210.

The blower 1 may suck ambient air through air inlet 211 formed in the lower case 210, filter air sucked from the filter 220, and discharge the filtered air from the tower case 140. The tower case 140 may discharge air at a position higher than the lower case 210.

The blower 1 may have a columnar shape whose diameter decreases toward an upper portion, and the blower 1 may have a conical or truncated cone shape as a whole. When a cross section becomes narrower toward the upper side, a center of gravity may be lowered, and the risk of overturning due to external impact may decrease. However, in other examples, the cross section may be in a form that does not become narrower toward the upper side.

For the convenience of assembly, the lower case 210 and the tower case 140 may be manufactured and assembled as separate parts. However, in other examples, the lower case 210 and the tower case 140 may be partially or entirely integrated. For example, the lower case 210 and the tower case 140 may be manufactured in the form of a front case and a rear case integrating, respectively, front and rear portions of the lower case 210 and the tower case 140 and then assembled.

The lower case 210 may be formed to have a gradually decreasing diameter toward an upper end, and the tower case 140 may also be formed to have a gradually decreasing diameter toward the upper end. The outer side surfaces of the lower case 210 and the tower case 140 may form a continuous surface. The lower end of the tower base 130 and the upper end of the lower case 210 may be in close contact with each other, and the outer side surface of the tower base 130 and the outer side surface of the lower case 210 may form a continuous surface. To this end, a diameter of the lower end of the tower base 130 may be formed to be substantially the same as or slightly smaller than that of the upper end of the lower case 210.

The lower case 210 and the tower case 140 may be rotated in a circumferential direction by a driving unit 700 (see FIG. 13) disposed below the lower case 210. The driving unit 700 may rotate the entire blower 1 body including the case 100, the blowing unit 200, and the towers 110 and 120. When a portion of the blower 1 is rotated by the driving unit 700, the direction of the horizontal airflow discharged from the blower 1 through the blowing space 105 may be changed.

The tower base 130 distributes the filtered air supplied from the inside of the lower case 210, and provides the distributed air to the first tower 110 and the second tower 120. The tower base 130 may connect the first tower 110 and the second tower 120, and the blowing space 105 may be formed above the tower base 130.

The outlets 117 and 127 may be formed above the tower base 130, and the upward airflow and horizontal airflow are formed above the tower base 130. In order to minimize friction with air, an upper side surface 131 of the tower base 130 may be formed as a curved surface. The upper side surface 131 may be formed in a downward concave curved shape, and may be formed to extend in the front-rear direction. One side 131*a* of the upper side surface 131 may be connected to the first inner side wall 115, and the other side 131*b* of the upper side surface 131 may be connected to the second inner side wall 125.

Figure 5:
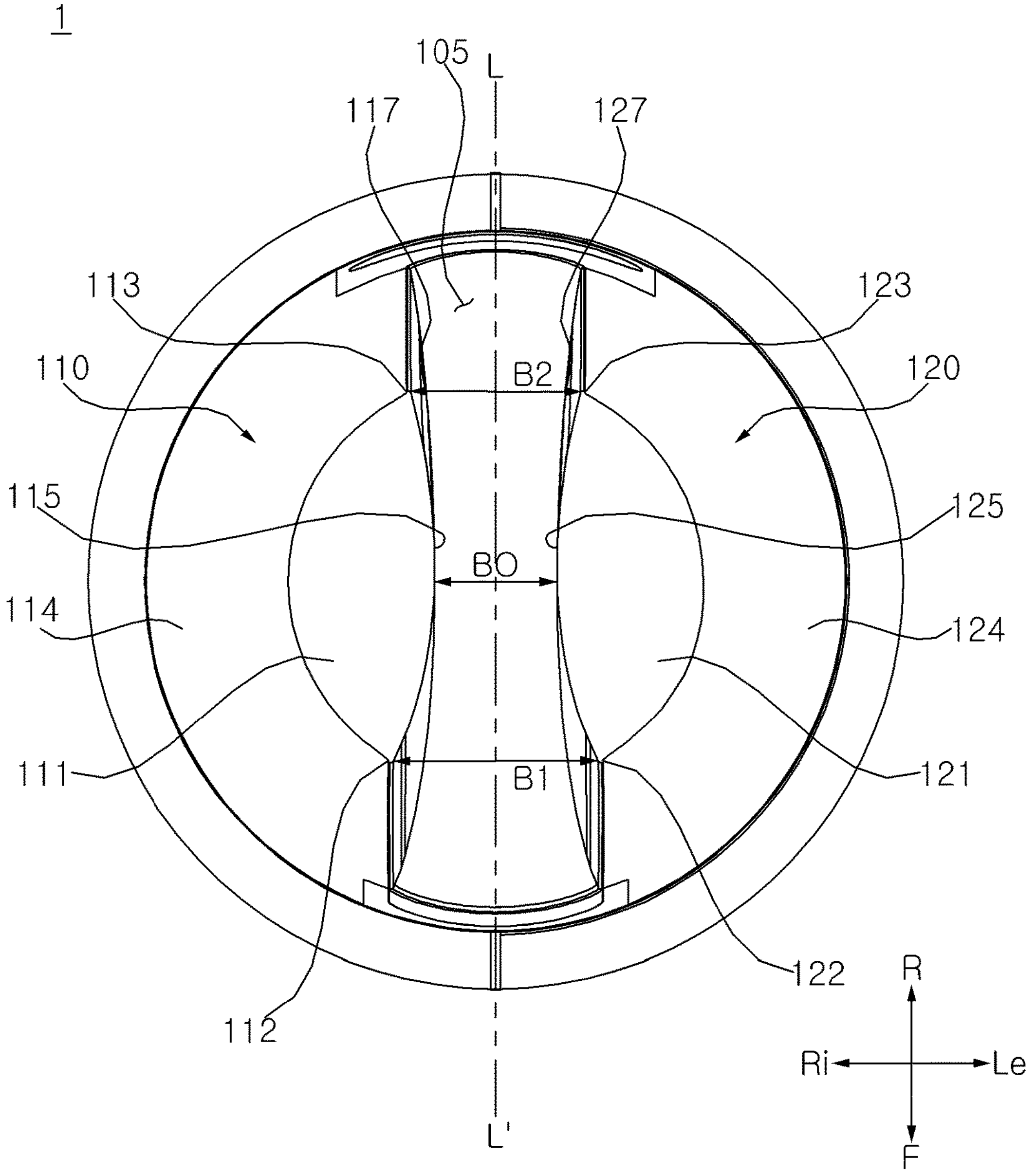
FIG. 5 is a plan view of FIG. 1.

When viewed from a top view with reference to FIG. 5, the first tower 110 and the second tower 120 may be symmetrical in a left and right direction with respect to a center line L-L'. The first outlet 117 and the second outlet 127 may be formed to be symmetrical in the left and right direction with respect to the center line L-L'. The center line L-L' is an imaginary line between the first tower 110 and the second tower 120, may be formed in the front-rear direction in this embodiment, and may be formed to pass through the upper side surface 131.

In other examples, the first tower 110 and the second tower 120 may be formed in an asymmetrical shape. However, when the first tower 110 and the second tower 120 are symmetrically disposed with respect to the center line L-L', the air flow may be uniformly distributed in the blowing space 105, which makes it easier to control the horizontal airflow and the upward airflow.

Figure 6:
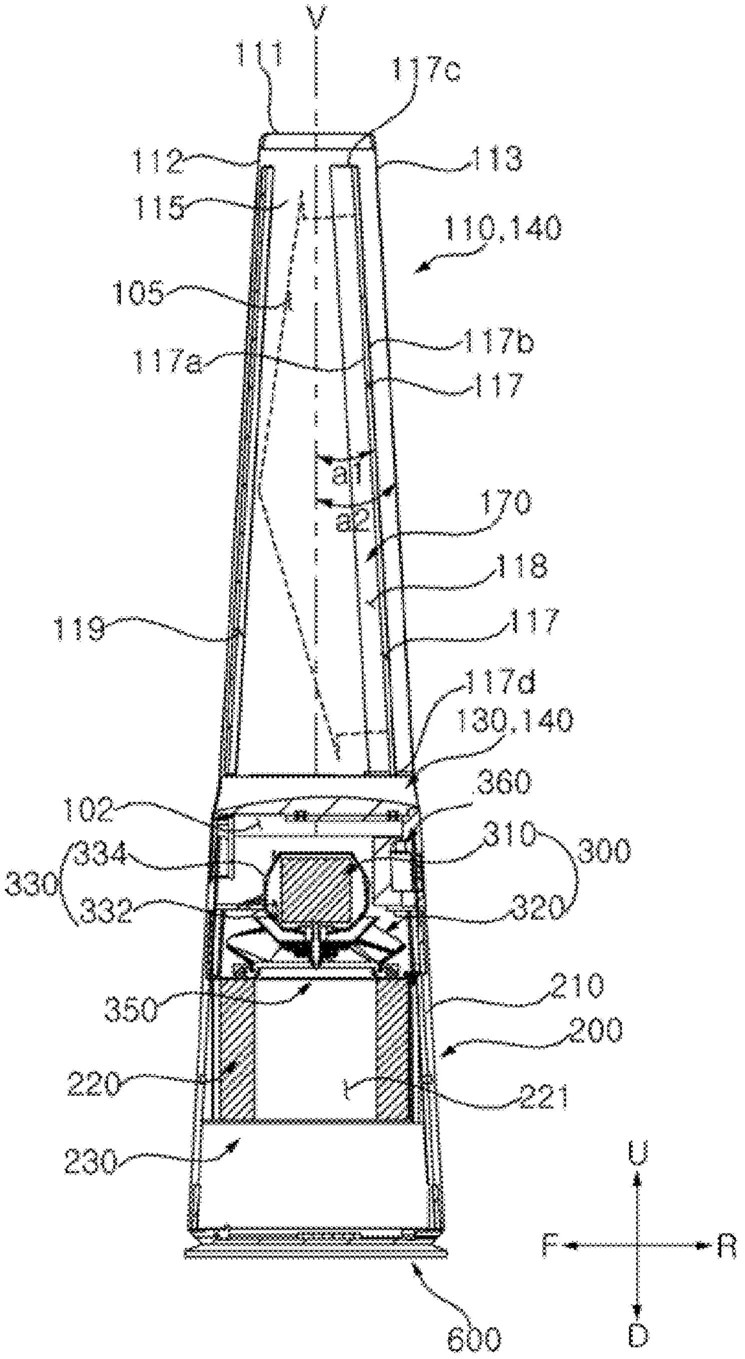
FIG. 6 is a right cross-sectional view of FIG. 1.
Figure 7:
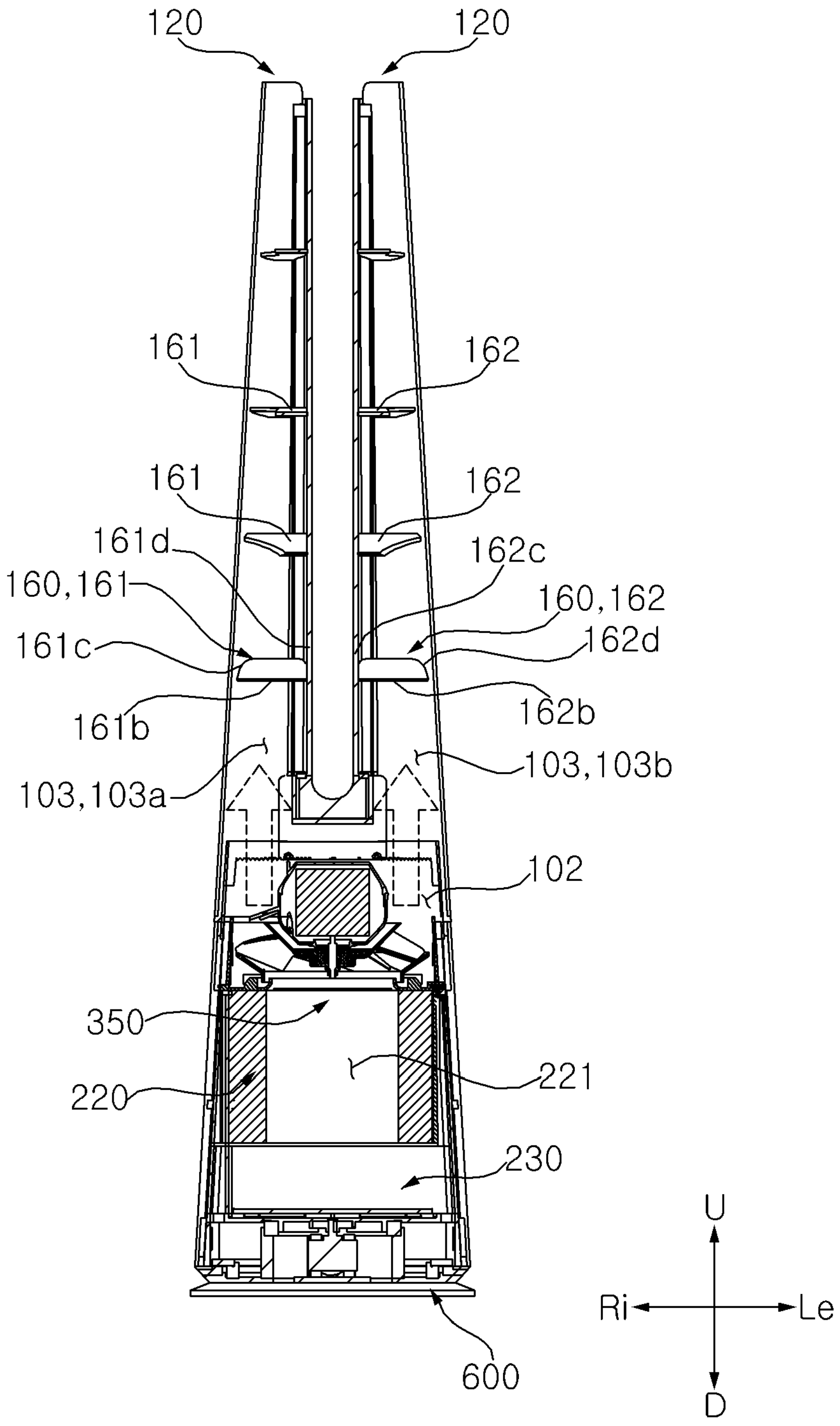
FIG. 7 is a front cross-sectional view of FIG. 1.
Figure 8:
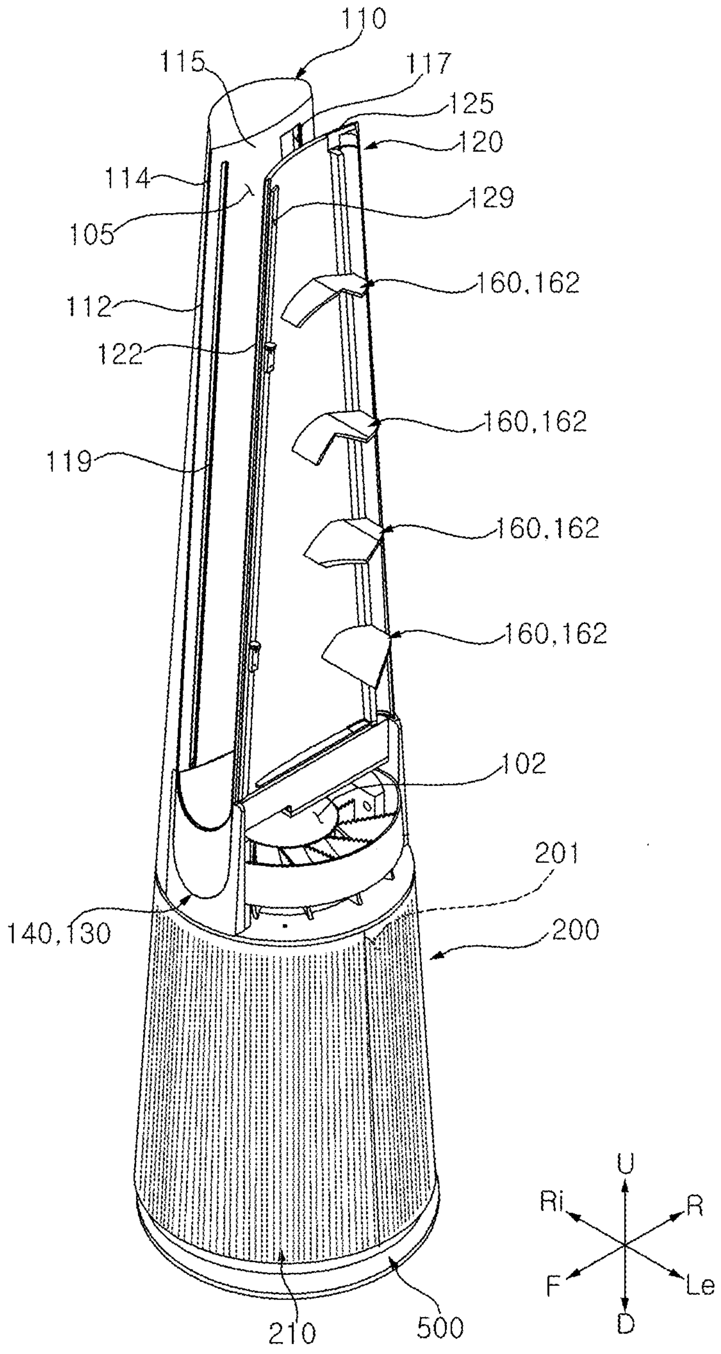
FIG. 8 is a partial exploded perspective view illustrating an inside of a second tower of FIG. 1.

Hereinafter, the internal structure of the blower 1 will be described with reference to FIGS. 6 to 8. The blower 1 may include a filter 220 that is disposed inside the case 100, and a fan device 300 that is disposed inside the case 100 to make the air sucked through the air inlet 211 flow to the outlets 117 and 127. The filter 220 and the fan device 300 may be disposed inside the lower case 210.

The lower case 210 may be formed in a truncated cone shape, and an upper side thereof may be open. The blowing unit 200 may include the filter 220 and the fan device 300 may include a lower case 210 that is disposed to surround the filter 220 and the fan device 300, and a plurality of air inlets 211 for communicating between the inner and outer sides may be formed along a circumferential direction of the lower case 210.

The lower case 210 may be formed in a truncated cone shape with upper and lower sides open. The lower case 210 may be manufactured to be separated into two parts, and the two parts may be assembled to form the above-described truncated cone shape. The two parts may be divided into a front case (not illustrated) separated to the front side of the blower 1 and a rear case (not illustrated) separated to the rear side, and the filter 220 disposed inside the lower case 210 may be withdrawn by separating the two parts.

The filter 220 may be formed in a cylindrical shape having a hollow 221 extending in the up-down direction therein, and the outer side surface of the filter 220 may face the air inlet 211. The external air of the blower 1 flows by passing through the inside of the filter 220 from the outside of the filter 220, and in this air flow process, foreign substances and/or harmful gases in air may be removed by the filter 220.

The fan device 300 may be disposed above the filter 220, and may blow air passing through the filter 220 to the first tower 110 and the second tower 120. The fan device 300 may include a fan housing 360, a fan motor 310 disposed inside the fan housing 360, and a fan 320 rotating by the fan motor 310.

The fan motor 310 may be disposed above the fan 320, and a motor shaft of the fan motor 310 may be coupled to the fan 320 disposed below. A motor housing 330 in which the fan motor 310 is installed may be disposed above the fan 320.

The motor housing 330 may have a shape that surrounds the entire fan motor 310, and since the motor housing 330 surrounds the entire fan motor 310, flow resistance with air flowing from the lower side to the upper side may be reduced. In another example, the motor housing 330 may be formed in a shape that surrounds only a portion, e.g., the lower portion, of the fan motor 310.

The motor housing 330 may include a lower motor housing 332 and an upper motor housing 334. At least one of the lower motor housing 332 or the upper motor housing 334 may be coupled to the case 100, and the lower motor housing 332 may be coupled to the case 100. The fan motor 310 may be installed above the lower motor housing 332, and then be covered with the upper motor housing 334 to surround the fan motor 310.

The motor shaft of the fan motor 310 passes through the lower motor housing 332 and may be assembled to a lower side of the fan 320. The fan 320 may include a hub to which the motor shaft of the fan motor 310 is coupled, a shroud spaced apart from the hub, and a plurality of blades connecting the hub and the shroud.

The air that has passed through the filter 220 may sucked into the shroud, and then flow by being pressurized by the rotating blade. The hub may be disposed above the blade, and the shroud may be disposed below the blade. The hub may be formed in a downward concave bowl shape, and a lower portion of the lower motor housing 332 may be partially inserted into the hub.

The fan 320 may use a four-flow fan. The four-flow fan sucks air in the center of the rotation shaft and discharges air in a radial direction, but the discharged air may be inclined with respect to an axial direction. Since the entire air flow flows from the lower side to the upper side, when air is discharged in a radial direction like a general centrifugal fan, a flow loss due to the change in the flow direction may occur. The four-flow fan may minimize the flow loss of air by discharging air upward in the radial direction.

A diffuser 340 may be disposed above the fan 320, and the diffuser 340 may guide a flow of air by the fan 320 in an upward direction. The diffuser 340 serves to further reduce a radial component in the flow of air blown from the fan 320 and enhance an upward direction air flow component.

The fan housing 360 may be formed in a cylindrical shape, and the upper and lower sides may be respectively open. The diffuser 340 may be disposed on the open upper side of the fan housing 360. The motor housing 330 may be disposed between the diffuser 330 and the fan 320.

In order to minimize the installation height of the motor housing in the up-down direction, the lower end of the motor housing 330 may be inserted into the fan 320 and overlap the fan 320. Also, the upper end of the motor housing 330 may be inserted into the diffuser 340 and overlap the diffuser 340. The lower end of the motor housing 330 may be disposed higher than the lower end of the fan 320, and the upper end of the motor housing 330 may be disposed lower than the upper end of the diffuser 340.

In order to optimize the installation position of the motor housing 330, the upper side of the motor housing 330 may be disposed inside the tower base 130, and the lower side of the motor housing 330 may be disposed inside the lower case 210. In another examples, the motor housing 330 may be disposed inside the tower base 130 or the lower case 210.

A suction grill 350 may be disposed inside the lower case 210. The suction grill 350 may blocks a user's finger from entering the fan 320 when the filter 220 is separated. The suction grill 350 may be disposed below the fan housing 360. The suction grill 350 may be integrally manufactured with the fan housing 360 or may be manufactured and assembled as a separate component from the fan housing 360. The suction grill 350 may be manufactured in a structure having openings through which air may pass, and the suction grill 350 may be manufactured in a shape such as a grid, a circle, or the like.

The filter 220 may be disposed below the suction grill 350, and the fan 320 may be disposed above the suction grill 350. The suction grill 350 may be formed with a plurality of through-holes in the up-down direction so that air can flow.

Inside the case 100, the space between the suction grill 350 and the outlets 117 and 127 may be defined as a ventilation space 102. The inner space of the first tower 110 and the second tower 120 in which the outlets 117 and 127 are formed inside the case 100 may be defined as the discharge space 103. The discharge space 103 may be divided into a first discharge space 103*a* corresponding to an inner space of the first tower 110 and a second discharge space 103*b* corresponding to an inner space of the second tower 120. The external air of the blower 1 may flow into a filter hollow 221 through the air inlet 211, and then may pass through the blowing space 102 to be discharged to the outside of the blower 1 through the outlets 117 and 127 via the ventilation space 102 and the discharge space 103.

A substrate housing 230 in which control devices 232 and 233 are accommodated may be disposed below the filter 220. The filter 220 may be disposed above the substrate housing 230 and may be seated on an upper surface of the substrate housing 230.

A space 230*s* for accommodating the control devices 232 and 233 may be formed in the substrate housing 230. The control devices 232 and 233 may include a first control device 232 that controls the operation of the driving unit 700 and the driving of the Coandă breaker 400, and a second control device 233 that controls the driving of the fan device 300.

At least a portion of the driving motor 710 may be disposed in the inner space 230*s* of the substrate housing 230. The driving motor 710 may rotate within the substrate housing 230. The control devices 232 and 233 and the driving motor 710 may be disposed above the rotating plate 500. Accordingly, the control devices 232 and 233 and the driving motor 710 may rotate together with the rotating plate 500. Since the control devices 232 and 233 and the driving motor 710 are electrically connected and disposed together in the inner space 230*s* of the substrate housing 230, the integrated management of electrical components may be achieved.

The driving unit 700 for rotating the blower 1 in the circumferential direction may be disposed below the substrate housing 230. The driving unit 700 may rotate a lower case 210, a substrate housing 230, a filter 220, a fan device 300, a first tower 110, and a second tower 120 in the circumference direction. The driving unit 700 may simultaneously rotate all structures disposed in the ventilation space 201 inside the lower case 210 and all structures disposed inside the tower case 140.

The discharge space 103 may be provided with an air guide 160 for switching the flow direction of air flowing upward to a horizontal direction. A plurality of air guides 160 may be disposed to be vertically spaced apart from each other. The air guide 160 may switch the flow direction of the air flowing from the lower side to the upper side to the horizontal direction, and the air with the switched flow direction may be discharged to the outside of the blower 1 through the outlets 117 and 127. A guide disposed inside the first tower 110 may be referred to as a first air guide 161, and a guide disposed inside the second tower 120 may be referred to as a second air guide 162.

When viewed from the front, the first air guide 161 may be coupled to the inner side wall 115 and/or the outer side wall 114 of the first tower 110. In order to guide the air flowing downward to the first outlet 117, the first air guide 161 may have an upward convex curved surface in which the front side is lower than the rear side. A rear end 161*b* of the first air guide 161 may be disposed adjacent to the first outlet 117 and may be connected to the rear end 113 of the first tower 110. At least a portion of a left end 161*c* of the first air guide 161 may be in close contact with or coupled to the left wall 114 of the first tower 110. At least a portion of a right end 161*d* of the first air guide 161 may be in close contact with or coupled to the right wall 115 of the first tower 110.

Since the second air guide 162 is formed to be symmetrical in a left and right direction with respect to the first air guide 161, the description of the second air guide 162 may be equally applied to the description of the first air guide 161. For example, the rear end 161*b* of the first air guide 161 may correspond to the rear end of the second air guide 162*b*, the left end 161*c* of the first air guide 161 may correspond to the left end of the second air guide 162*c*, and the right end 161*d* of the first air guide 161 may correspond to the right end 162*d* of the second air guide 162. It should be appreciated, however, that the first air guide 161 and the second air guide 162 may have different structures and shapes.

The first outlet 117 may be formed between the front end 112 and the rear end 113 of the first tower 110 and may be formed relatively closer to the rear end 113. The air discharged from the first outlet 117 may flow along the first inner side wall 115 by the Coandă effect and may flow toward the front end 112.

The first outlet 117 may include a first border 117*a* that forms an edge on the air discharge side (front end in the present embodiment), a second border 117*b* that forms an edge on a side (rear end in the present embodiment) opposite to the air discharge side, an upper border 117*c* that forms an upper edge of the first outlet 117, and a lower border 117*d* that forms a lower edge of the first outlet 117. In certain examples, the first border 117*a* and the second border 117*b* may be formed parallel to each other, and the upper border 117*c* and the lower border 117*d* may be formed parallel to each other.

In certain examples, the first border 117*a* and the second border 117*b* may be inclined relative to a vertical direction V, and the rear end 113 of the first tower 110 may also be inclined relative to the vertical direction V. For example, an inclination a1 of the first border 117*a* and the second border 117*b* in the vertical direction V may be formed at 4°, and an inclination a2 of the rear end 113 may be formed at 3°. That is, the inclination a1 of the outlet 117 may be greater than the inclination a2 of the rear end 113 of the first tower 110.

The second outlet 127 may be formed to be symmetrical left and right with respect to the first outlet 117, and the description of the second outlet 127 may be equally applied to the description of the first outlet 117. Accordingly, the second outlet 127 and the rear end 123 of the second tower 120 may be formed to be inclined with respect to the vertical direction V, and the inclination a1 of the second outlet 127 may be formed to be greater than the inclination a2 of the rear end 123 of the second tower 120. It should be appreciated, however, that the first outlet and the second outlets may have different forms.

Figure 10:
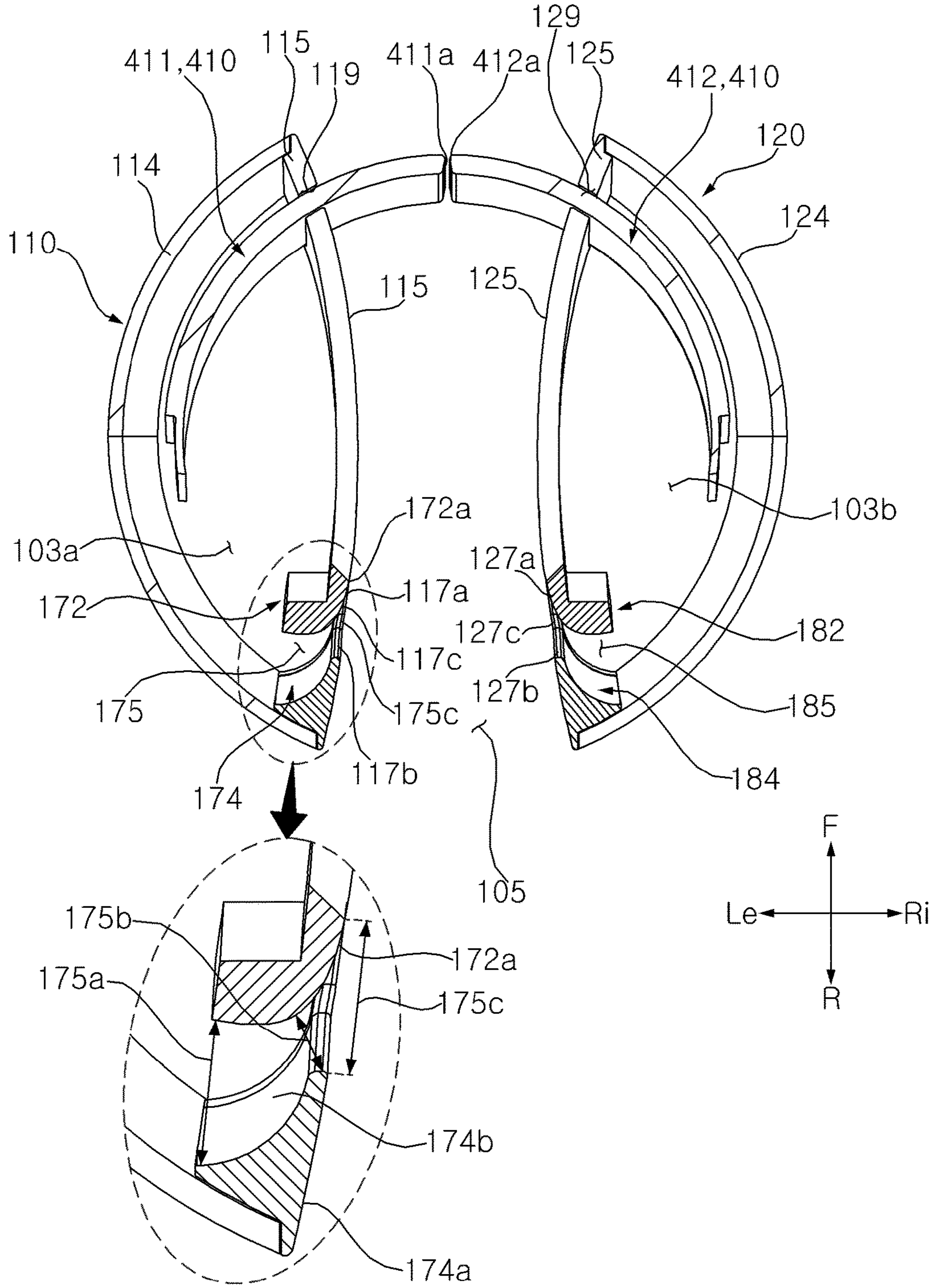
FIG. 10 is a bottom view of a cross section taken along line A-A of FIG. 2.

Hereinafter, the structure for inducing the Coandă effect in the blowing space 105 and the structure for inducing the Coandă breaker 400 for switching the flow direction of air discharged through the outlets 117 and 127 will be described with reference to FIGS. 9 and 10. The first outlet 117 of the first tower 110 may be formed to face the second tower 120, and the second outlet 127 of the second tower 120 may be formed to face the first tower 110.

The air discharged from the first outlet 117 may flow along the inner side wall 115 of the first tower 110 by the Coandă effect. The air discharged from the second outlet 127 may flow along the inner side wall 125 of the second tower 120 by the Coandă effect.

The towers 110 and 120 of the blower 1 may further include a first discharge case 170 and a second discharge case 180, respectively. Although not illustrated, the first discharge case 170 may be manufactured in the form of an inner case disposed inside the first tower 110, and the air guide (not illustrated) may be disposed inside the first discharge case 170. The second discharge case 180 may also be manufactured in the form of an inner case disposed inside the second tower 120, and the air guide (not illustrated) may be disposed inside the second discharge case 180. When the first discharge case 170 and the second discharge case 180 are manufactured in the form of the inner case, the air from the ventilation space 102 may be directly delivered.

The first outlet 117 may be formed in the first discharge case 170, and the first discharge case 170 may be assembled to the first tower 110. The second outlet 127 may be formed in the second discharge case 180, and the second discharge case 180 may be assembled to the first tower 120. The first discharge case 170 may be installed to penetrate through the inner side wall 115 of the first tower 110, and the second discharge case 180 may be installed to penetrate through the inner side wall 125 of the second tower 120.

The first tower 110 may include a first discharge opening 118 in which the first discharge case 170 is installed, and the second tower 120 may include a second discharge opening 128 in which the second discharge case 180 is installed. The first discharge case 170 may include a first discharge guide 172 that forms the first outlet 117 and is disposed on the air discharge side of the first outlet 117 and a second discharge guide 174 that forms a first outlet 117 and is disposed to be spaced apart from the first discharge guide 172. Outer side surfaces **172*a* and 174*a* of the first discharge guide 172 and the second discharge guide 174 may form a part of the inner side wall 115 of the first tower 110**.

The inner side of the first discharge guide 172 may communicate with the first discharge space **103*a*, and the outer side thereof may communicate with the blowing space 105. The inner side of the second discharge guide 174 may communicate with the first discharge space 103*a*, and the outer side thereof may communicate with the blowing space 105**.

The outer side surface **172*a* of the first discharge guide 172 may be formed as a curved surface, and the outer side surface 172*a* may form a continuous surface with the first inner side wall 115. An outer side surface 174*a* of the second discharge guide 174 may form a continuous surface with the first inner side wall 115, and an inner side surface 174*b* of the second discharge guide 174 is formed as a curved surface. The inner side surface 174*b* may form a continuous curved surface with the inner side surface of the first outer side wall 115, and by such a structure, the air in the first discharge space 103*a* may be guided to flow toward the first discharge guide 172**.

The first outlet 117 may be formed between the first discharge guide 172 and the second discharge guide 174, and the air in the first discharge space **103*a* may be discharged to the blowing space 105 through the first outlet 117. For example, the air in the first discharge space 103*a* may be discharged between the outer side surface 172*a* of the first discharge guide 172 and the inner side surface 174*b* of the second discharge guide 174, and a separation distance between the outer side surface 172*a* of the first discharge guide 172 and the inner side surface 174*b* of the second discharge guide 174 may be defined as a discharge interval 175. The first discharge guide 172 and the second discharge guide 174** may form a predetermined channel.

In the discharge interval 175, a width of an intermediate portion **175*b* may be narrower than that of an inlet 175*a* and an outlet 175*c*. The intermediate portion 175*b* is defined as a shortest distance between the second border 117*b* and the outer side surface 172*a*. A cross-sectional area of the discharge interval 175 may be gradually narrowed from the inlet 175*a* to the intermediate portion 175*b*, and the cross-sectional area may increase again from the intermediate portion 175*b* to the outlet 175*c*. The intermediate portion 175*b* may be located inside the first tower 110, and when viewed from the outside, the outlet 175*c* of the discharge interval 175 may be seen as the outlet 117**.

In order to induce the Coandă effect, a radius of curvature of the inner side surface **174*b* of the second discharge guide 174 may be larger than that of the outer side surface 172*a* of the first discharge guide 172. In certain examples, a center of curvature of the outer side surface 172*a* of the first discharge guide 172 may be located in front of the outer side surface 172*a* and may be formed inside the first discharge space 103*a*. The center of curvature of the inner side surface 174*b* of the second discharge guide 174 may be located on the side of the first outlet 117 and may be formed inside the first discharge space 103*a***.

The second discharge case 180 may include a first discharge guide 182 that forms the second outlet 127 and may be disposed on the air discharge side of the second outlet 127, and a second discharge guide 184 that forms the second outlet 127 and a second discharge guide 184 may be disposed to be spaced apart from the first discharge guide 182, and a discharge interval 185 may be formed between the first discharge guide 182 and the second discharge guide 184. The second discharge case 180 may be disposed to be symmetrical in a left and right direction with respect to the first discharge case 170, and the description of the first discharge case 170 may be equally applied to the second discharge case 180. It should be appreciated, however, that the first discharge case 170 and the second discharge case 180 may have different structures.

The blower 1 may further include the Coandă breaker 400 (also referred to as airflow converter) for switching the flow direction of air flowing in the blowing space 105. In one example discussed below, the Coandă breaker 400 may switch the horizontal airflow of air flowing in the blowing space 105 into the upward airflow.

The Coandă breaker 400 may include a first Coandă breaker 401 disposed on the first tower 110, and a second Coandă breaker 402 disposed on the second tower 120. The first Coandă breaker 401 and the second Coandă breaker 402 may be disposed symmetrically in a left and right direction and may have substantially similar configurations. It should be appreciated, however, that the first Coandă breaker 401 and the second Coandă breaker 402 may have different configurations, such as to create air flows in different directions and/or different intensities.

The Coandă breaker 400 may include one or more of a guide board 410 that is disposed on the towers 110 and 120 and protrudes toward the blowing space 105, a guide motor 420 that provides a driving force for movement of the guide board 410, a power transmission member (not illustrated) that transmits a driving force generated from the guide motor 420 to the guide board 410, and a board guider 440 that is disposed inside the towers 110 and 120 and guides the movement of the guide board 410.

The guide board 410 may be hidden inside the towers 110 and 120, and at least a portion thereof may protrude into the blowing space 105 when the guide motor 420 operates. The guide board 410 may include a first guide board 411 that is disposed on the first tower 110, and a second guide board 412 that is disposed on the second tower 120.

The board slit 119 penetrating through the inner side wall 115 of the first tower 110 and the board slit 129 penetrating through the inner side wall 125 of the second tower 120 may be respectively formed so that the guide board 410 may protrude to the blowing space 105. The board slit 119 formed in the first tower 110 may be referred to as the first board slit 119, and the board slit formed in the second tower 120 may be referred to as the second board slit 129.

The first board slit 119 and the second board slit 129 may be formed to be symmetrical in a left and right direction, and the first board slit 119 and the second board slit 129 may be formed to extend long in the up-down direction. The first board slit 119 and the second board slit 129 may be disposed to be inclined with respect to the vertical direction V.

The front end 112 of the first tower 110 may be formed at an inclination of 3°, and the first board slit 119 may be formed at an inclination of 4°. The front end 122 of the second tower 120 may be formed at an inclination of 3°, and the second board slit 129 may be formed at an inclination of 4°.

The guide board 410 may be formed in a flat or curved plate shape or a combination thereof (e.g., a first portion of the guide board 410 may be formed in a flat plate shape and second portion of the guide board 410 may be formed in curved plate shape), may be formed to extend relatively longer in the up-down direction, and may be disposed in front of the blowing space 105. In certain examples, the guide board 410 may be shaped and positioned to block the horizontal airflow of the air flowing in the front of the blower 1 through the blowing space 105, and the guide board 410 may switch the air flowing in the blowing space 105 to flow in the upward direction.

An inner side end 411*a* of the first guide board 411 and an inner side end 412*a* of the second guide board 412 may be in contact with or positioned close to each other (e.g., separated by less than 20 mm) to block air flowing toward the front of the blower 1 and guide the air to flow upward. Alternatively, a single guide board 410 may be in close contact with the opposite tower to perform the above-described function.

When the Coandă breaker 400 may not protrude to the blowing space 105, the inner end 411*a* of the first guide board 411 may close the first board slit 119, and the inner side end 412*a* of the second guide board 412 may close the second board slit 129. When the Coandă breaker 400 operates and protrudes to the blowing space 105, the inner side end 411*a* of the first guide board 411 may pass through the first board slit 119 and may protrude to the blowing space 105, and the inner side end 412*a* of the second guide board 412 may penetrate through the second board slit 129 and may protrude to the blowing space 105.

The first guide board 411 and the second guide board 412 may protrude to the blowing space 105 through a rotation operation. Alternatively, at least one of the first guide board 411 and the second guide board 412 may linearly move in a slide manner and protrude to the blowing space 105.

When viewed from a top view, the first guide board 411 and the second guide board 412 may have an arc shape. The first guide board 411 and the second guide board 412 may form a predetermined radius of curvature, and the center of curvature may be located in the blowing space 105.

The board guider 440 may be assembled to the outer side walls 114 and 124 of the towers 110 and 120. The board guider 440 may be disposed radially outward with respect to the guide board 410, and by such a structure, frictional resistance generated in the air flowing in the discharge space 103 may be reduced.

Figure 11:
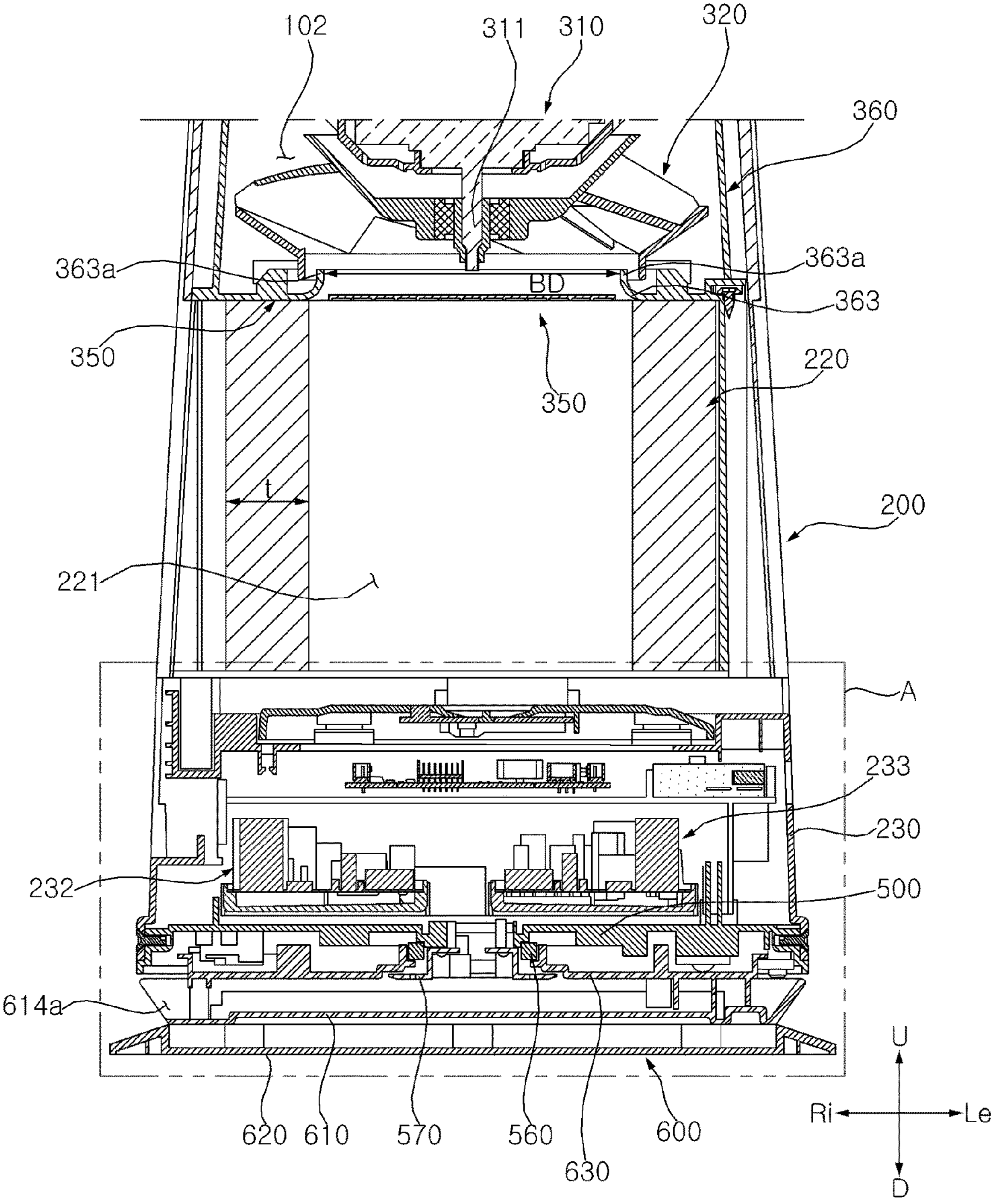
FIG. 11 is an enlarged view of a lower portion of a longitudinal cross-sectional view of FIG. 1.
Figure 12:
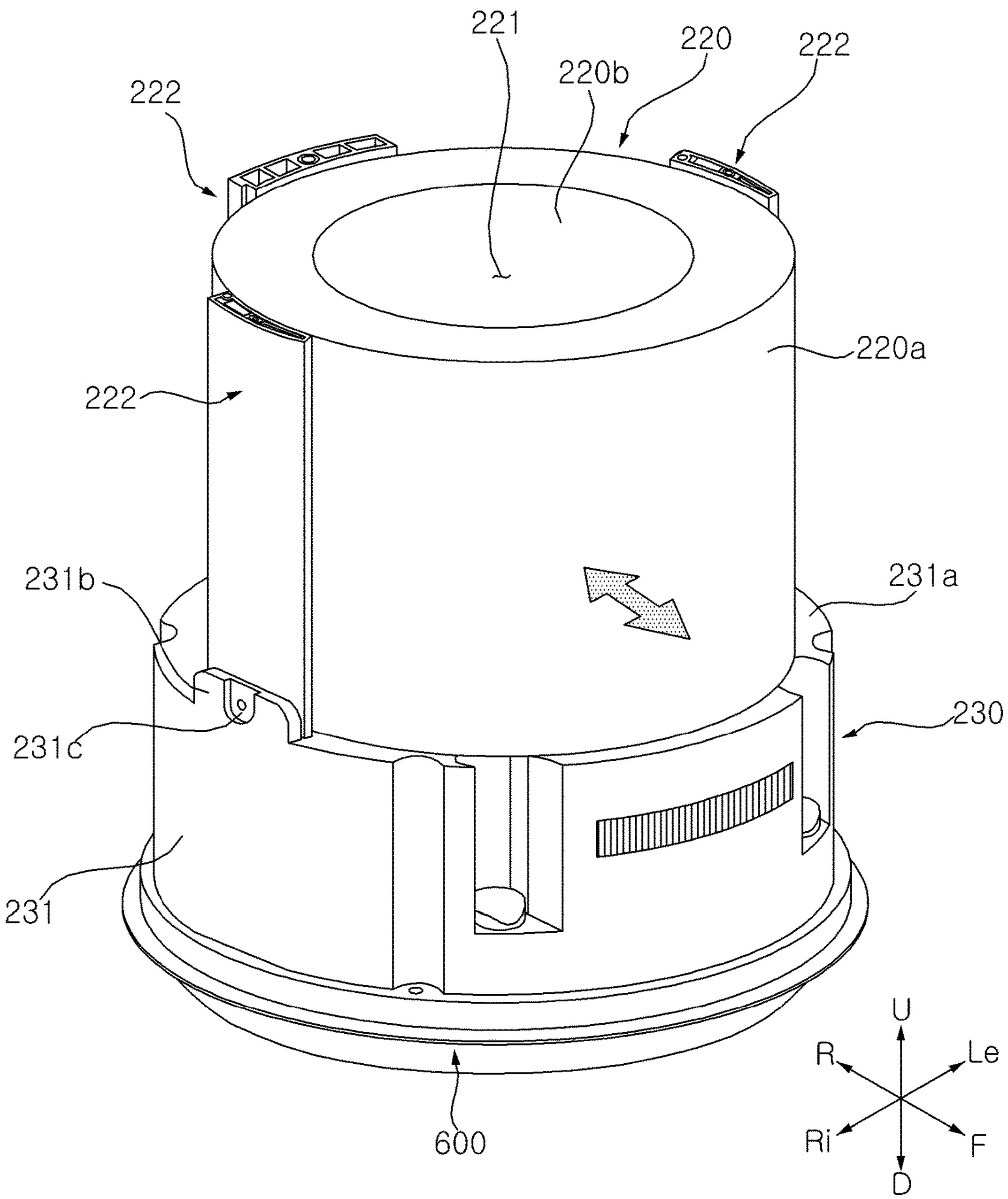
FIG. 12 is a partial perspective view of an inside of a case illustrating a filter installation structure.

Hereinafter, the internal structure of the blowing unit 200 will be described with reference to FIGS. 11 and 12. The fan housing 360 may include a bell mouth 363 that guides air passing through the filter 220 to the fan 320. The bell mouth 363 may be disposed above the filter 220, and the suction grill 350 may be disposed between the filter 220 and the bell mouth 363.

The bell mouth 363 may have a ring shape having a predetermined inner diameter BD, and the inner side thereof may be open in an up-down direction. The inner diameter BD may be understood as a diameter of an inner circumferential surface 363*a* of the bell mouth 363, and an air flow path toward the fan 320 may be formed inside the bell mouth 363. The fan 320 may be connected to the rotation shaft 311 and may generate a suction force with respect to the air in the filter hollow 221 by rotation, and the air in the filter hollow 221 may flow into the fan housing 360 through the suction grill 350 and the bell mouth 363.

The filter 220 may have a cylindrical shape in which the filter hollow 221 is formed, and the air introduced into the lower case 210 through the air inlet 211 may pass through the outer circumferential surface 220*a* and the inner circumferential surface 220*b* of the filter 220 and flow into the filter hollow 221. The introduced air may flow from the outer circumferential surface 220 to the inner circumferential surface 220*b* of the filter 220 and may flow into the hollow filter 221 in a state in which contained foreign substances are filtered out by one or more of a pre-filter, a high-efficiency particulate air (HEPA) filter, and/or a deodorizing filter disposed between the outer circumferential surface 220*a* and the inner circumferential surface 220*b*.

The filter 220 may be supported by a filter frame 222 that limits movement of the filter 220 in a radially outward direction. The filter frame 222 may extend in an up-down direction and may be in contact with the outer circumferential surface 220*a* of the filter 220. A plurality of filter frames 222 may be disposed to be spaced apart in the circumferential direction, and in one example, three filter frames 222 may be included in the blowing unit 200. Air may enter and exit the filter 220 through at least one area of the filter 220 where the filter frame 222 is not disposed. The lower case 210 may be disposed to be detachable to the driving unit 700, and after removing the lower case 210, the user can take out the filter 220 and clean the filter 220.

The filter frame 222 may be connected to the substrate housing 230 disposed below the filter 220. The substrate housing 230 may be in contact with the lower surface of the filter 220 to support the filter 220. The substrate housing 230 may include a housing outer wall 231 that extends in the circumferential direction and is supported by the driving unit 700.

The housing outer wall 231 may include at least one of a housing outer wall upper surface 231*a* that extends in the circumferential direction, a frame connection part 231*b* that protrudes upward from the housing outer wall upper surface 231*a*, and/or a fastening hole 231*c* that is formed in the frame connection part 231*b*. The filter frame 222 may be connected to the housing outer wall 231 through a predetermined fastening member (not illustrated) penetrating through the fastening hole 231*c*, and may be fixed by the substrate housing 230.

The driving unit 700 for rotating the blower 1 may be disposed below the substrate housing 230. The driving unit 700 may include the base 600 in contact with the ground, and the rotating plate 500 that is rotatably disposed on the upper side of the base 600. The substrate housing 230 may be disposed above the rotating plate 500, and the rotating plate 500 may rotate while supporting the loads of all of the rotating structures 100, 110, 120, 130, 140, 200, 210, 220, 230, and 300 disposed above the substrate housing 230, including the substrate housing 230.

Figure 13:
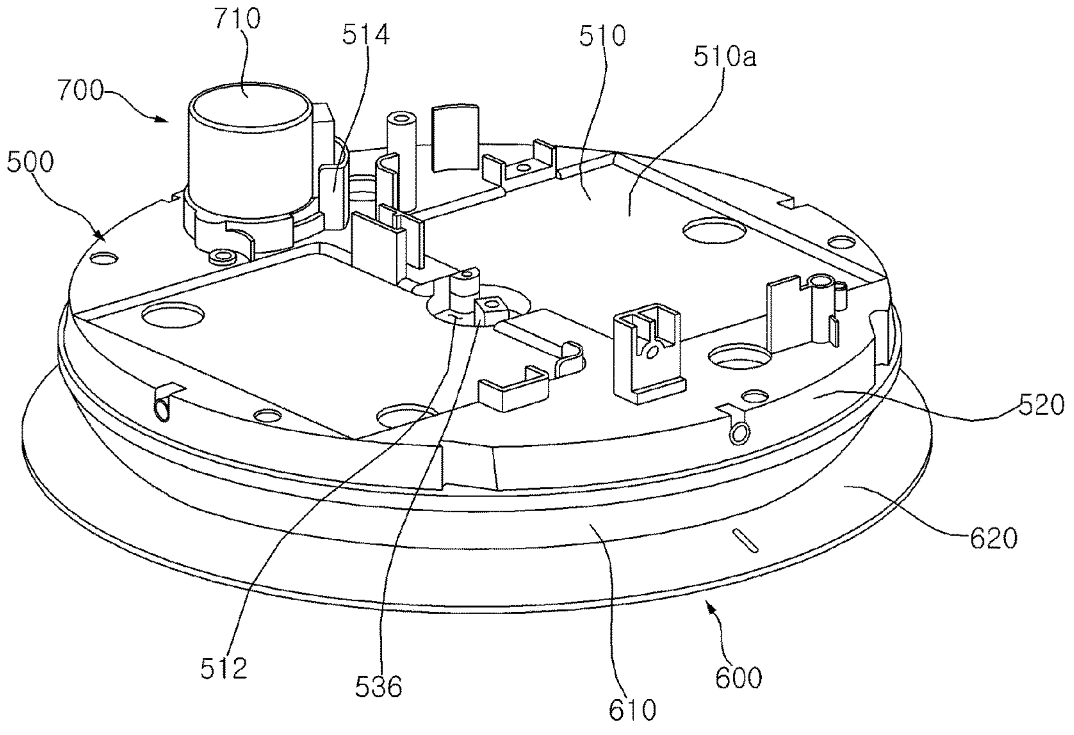
FIG. 13 is an enlarged view of A of FIG. 11.
Figure 14:
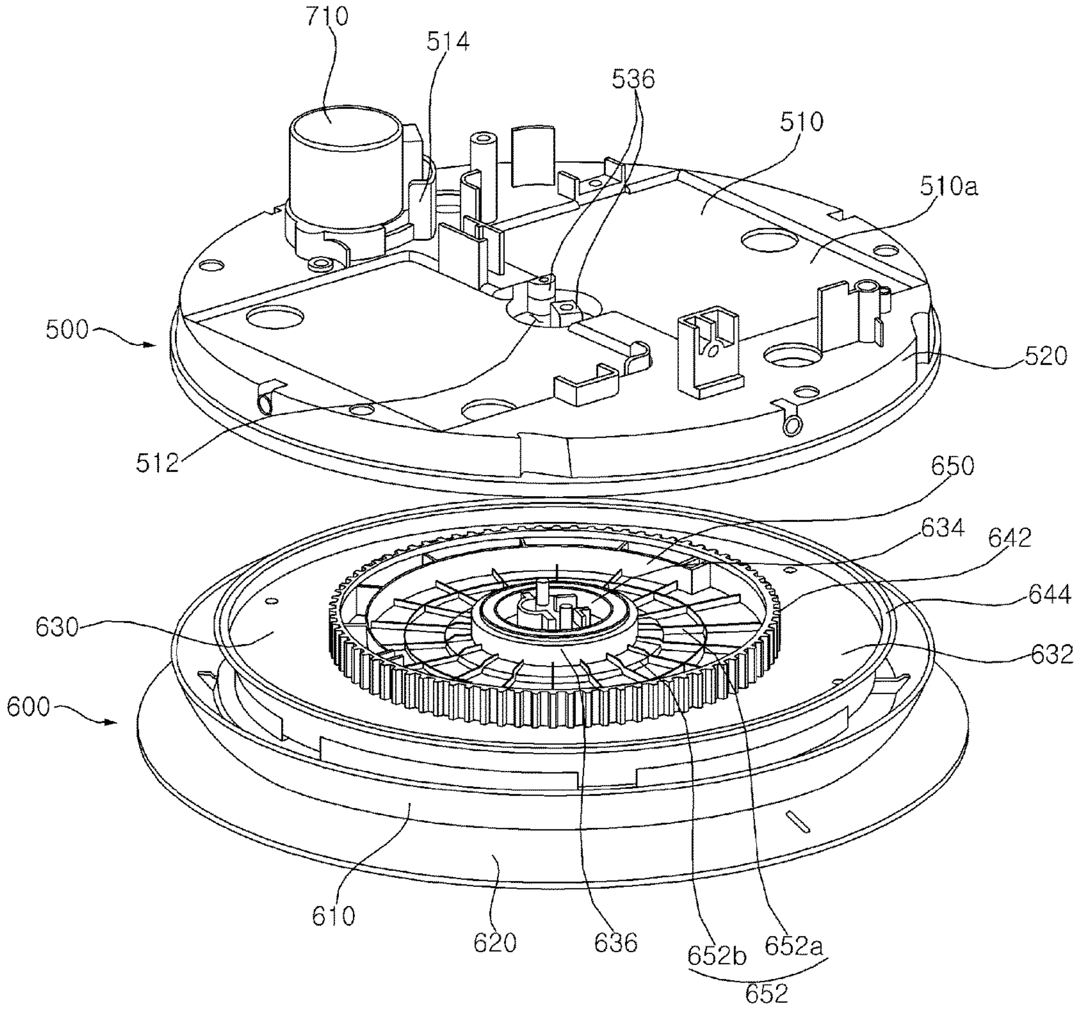
FIG. 14 is a perspective view in which a rotating plate and a base are coupled according to an embodiment of the present disclosure.

Hereinafter, the structure and operation of the rotating plate 500 and the base 600 according to an embodiment of the present disclosure will be described with reference to FIGS. 13 to 23. Referring to FIG. 14, the blower 1 may include the base 600, the rotating plate 500 connected to the case 100 and rotatably disposed above the base 600, and the driving unit 700 that rotates the rotating plate 500 above the base 600.

Figure 15:
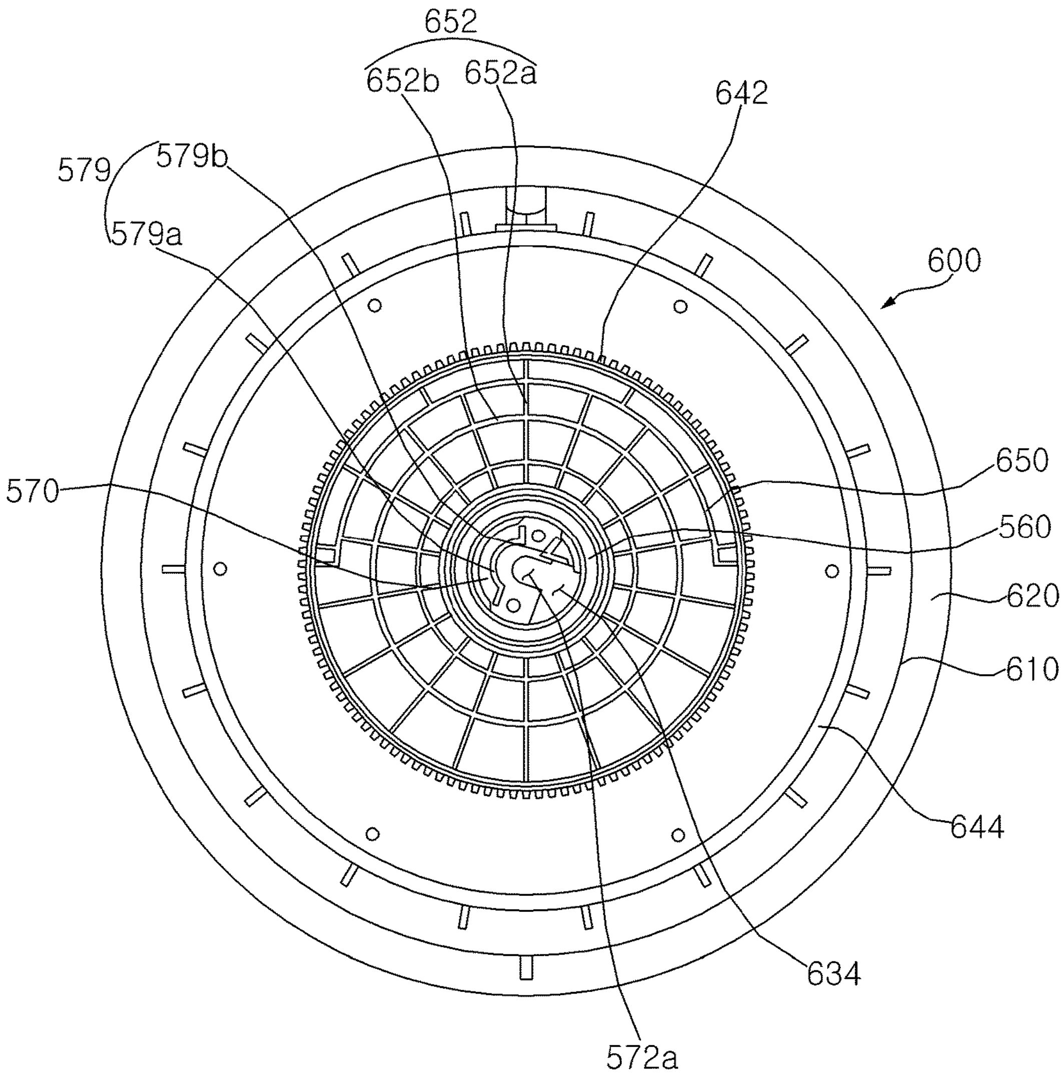
FIG. 15 is an exploded perspective view of the rotating plate and the base of FIG. 14.

Referring to FIG. 15, the blower 1 may include at least one of a shaft bearing 560 that is disposed between the base 600 and the rotating plate 500 and that supports the rotation of the rotating plate 500, and/or an electric wire holder 570 that is fixedly disposed on the rotating plate 500 and fixes the electric wires arranged above the rotating plate 500.

The rotating plate 500 may be rotatably disposed above the base 600, and is supported by the base 600. When the rotating plate 500 is rotated, the base 600 supports normal stress and shear stress generated by all structures disposed above the base 600, including the rotating plate 500. Referring to FIG. 13, the rotating plate 500 may include one or more of a plate 510, a circumferential cover 520 that extends downward from an outer circumference of the plate 510, and/or a shaft body 530 that is disposed at the center of rotation of the plate 510 and protrudes in the direction of the base 600 and supports the rotation of the plate 510.

Referring to FIGS. 14 and 15, the plate 510 may have a disk shape as a whole, and a shaft through hole 512 that is open in the up-down direction in the center of plate 510. The rotating plate 500 has a shaft through-hole 512, which is open in the up-down direction, provided at the center where the shaft body 530 is formed. The electric wires to be described below may be arranged through the shaft through hole 512.

Referring to FIG. 13, the shaft body 530 may extend downward from the plate 510. The shaft body 530 may have a hollow ring shape. The shaft through hole 512 may be formed inside the shaft body 530. The shaft body 530 may include a first shaft body 532 forming the outer circumference of the shaft through hole 512, and a second shaft body 534 disposed on the outer circumference of the first shaft body 532. The first shaft body 532 may protrude relatively further downward than the second shaft body 534. For example, the first shaft body 532 and the second shaft body 534 may be formed to be stepped to each other.

The outer circumferential surface 532*a* of the first shaft body 532 may be disposed in contact with the inner circumferential surface 562*a* of the shaft bearing 560. The lower surface 534*a* of the second shaft body 534 may be disposed in contact with the upper surface 562*b* of the shaft bearing 560. Accordingly, the shaft bearing 560 may be stably disposed by the first shaft body 532 and the second shaft body 534.

Referring to FIG. 13, the overall outer shape of the shaft bearing 560 may be cylindrical, and a portion of the shaft body 530 may be penetrated inside the shaft bearing 560. Referring to FIG. 13, the first shaft body 532 may be penetratingly disposed inside the shaft bearing 560.

Referring to FIG. 14, a pair of fastening parts (or fastener) 536 facing each other may be formed in the shaft through hole 512. The fastening part 536 may be fastened with a fastening member 537, such as an electric wire holder 570 and a bolt to be described below. The fastening part 536 may be formed by partially inserting the central part into the shaft through hole 512. The fastening part 536 may have a cylindrical shape extending in the up-down direction and may be disposed to protrude into the shaft through hole 512.

Referring to FIG. 14, a motor mounting part 514 may fix the driving motor 710 of the driving unit 700 and may be disposed on the upper surface of the plate 510. The motor mounting unit 514 may have a structure in which the driving motor 710 is seated. The driving motor 710 may be fastened to the rotating plate 500 through a separate fastening means such as a screw or nail (not illustrated) while seated on the motor mounting unit 514. The driving motor 710 may be disposed at a position radially spaced apart from the center of rotation of the plate 510.

Figure 16:
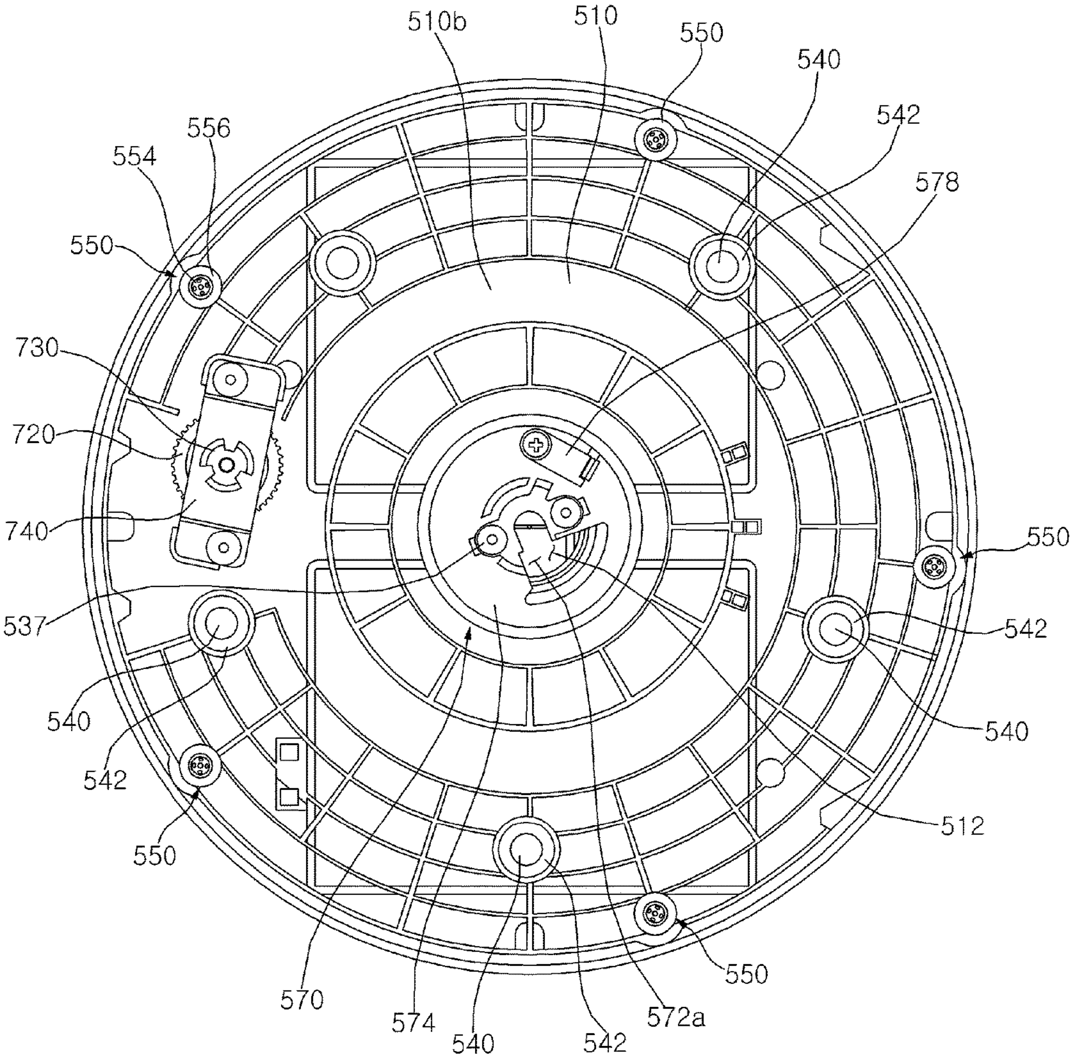
FIG. 16 is a bottom view of the rotating plate according to an embodiment of the present disclosure.

Referring to FIG. 16, a plurality of ball bearings 540 may support a load applied to the rotating plate 500 and may be disposed on a lower surface 510*b* of the plate 510. The plurality of ball bearings 540 may be disposed at positions spaced apart from the shaft body 530 in the radial direction.

The ball bearing 540 may be disposed farther radially outward than a base gear 642 of the base 600, to be described below. For example, the bearing holder 542 for fixing the arrangement of the ball bearing 540 may be disposed on the lower surface 510*b* of the plate 510. The bearing holder 542 may be disposed to protrude from the lower surface 510*b* of the plate 510 in the direction in which the base 600 is disposed, and may fix the arrangement of the ball bearing 540.

The ball bearing 540 may have a spherical shape that can freely rotate in the bearing holder 542. The ball bearing 540 may be disposed in contact with the upper portion of the base 600 disposed on the lower side. Therefore, when the rotating plate 500 rotates, the ball bearing 540 may contact the upper portion of the base 600 to distribute the load applied to the rotating plate 500.

Referring to FIG. 16, a plurality of ball bearings 540 may be disposed on the lower surface 510*b* of the plate 510. The plurality of ball bearings 540 may be spaced apart from each other in the circumferential direction. Referring to FIG. 16, a plurality of ball bearings 540 in one example, may be spaced apart from the center of rotation of the rotating plate 500 at the same intervals. However, in other examples, the plurality of ball bearings 540 may be spaced apart from each other at different intervals from the center of rotation of the rotating plate 500, such as to provide more of the ball bearings in regions of the rotating plate 500 supporting more weight (e.g., under driving unit 700 or other relatively heavy component) or to provide more support in certain regions of the rotating plate 500.

Referring to FIG. 16, a plurality of support bearings 550 that prevent one side of the case 100 from being lifted from the base 600 may be disposed on the lower surface 510*b* of the plate 510. The plurality of support bearings 550 may be radially spaced further apart from the center of rotation of the rotating plate 500 than the plurality of ball bearings 540. The plurality of support bearings 550 may be disposed between an edge rib 644 of the base 600 and a circumferential cover 520 of the rotating plate 500 to be described below.

Referring to FIG. 13, the support bearing 550 may include one or more of a support protrusion 552 formed to protrude downward from the rotating plate 500, a support shaft 554 connected to the support protrusion 552, and/or a wheel 556 through which the support shaft 554 penetrates. The support protrusion 552 may have an insertion hole (not illustrated) into which the support shaft 554 may be inserted, and the support shaft 554 may be inserted into the support protrusion 552 upward.

The support shaft 554 may support the wheel 556 and may use a screw or a pin. The support shaft 554 may be fixedly inserted into the support protrusion 552, and may support the wheel 556 so that the wheel 556 is not detached downward.

The wheel 556 may be rotatably disposed between the support protrusion 552 and the support shaft 554. The wheel 556 may use a roller, and the wheel 556 may be rotated using the support shaft 554 as a rotation shaft.

The wheel 556 may be disposed below the outer circumferential end of the upper body 630 of the base 600. The wheel 556 may be disposed below an outer rib 648 of the base 600, to be described below. Therefore, when the vibration or external force occurs in the case 100, the upper surface 556*a* of the wheel 556 may come into contact with the lower surface 648*a* of the outer rib 648 so that one side of the case 100 may be prevented from vibrating upward.

The wheel 556 may rotate with the support shaft 554 as the rotation shaft when the rotating plate 500 rotates and the wheel 556 contacts the outer rib 648 of the base 600. For example, the wheel 556 may rotate with the support shaft 554 as the rotation shaft and revolves around a rotation center O.

Referring to FIG. 13, the shaft bearing 560 may be disposed to surround a first layer 562 that rotates integrally with the rotating plate 500, and a second layer 564 that is disposed to surround the first layer 562 and rotates integrally with the base 600. For example, the first layer 562 may be disposed radially inside the second layer 564, and an outer circumferential surface of the first layer 562 may be in contact with an inner circumferential surface of the second layer 564. The second layer 564 may be disposed radially inside the rotation shaft housing 636 of the base 600, and the outer circumferential surface of the second layer 564 may be in contact with the inner circumferential surface of the shaft body 530.

The first layer 562 may rotate together with the rotating plate 500. On the other hand, the second layer 564 may be fixedly disposed on the rotating shaft housing 515, and may not rotate even when the rotating plate 500 is rotated. The first layer 562 may support the rotation of the shaft body 530, and the second layer 564 may support the rotation of the first layer 562. Accordingly, a lubricating oil may be injected between the first layer 562 and the second layer 564.

The shaft bearing 560 may be disposed on the rotating plate 500 to surround an outer circumferential surface 532*a* of the shaft body 530. The shaft bearing 560 may be disposed on the base 600 to be fixed to an inner circumferential wall 638 of the rotary shaft housing 515.

The base 600 may be in contact with the ground and may be fixedly disposed on the ground. The base 600 may have the shape of a bowl forming a space in which electric wires are arranged. The base 600 may have a structure that prevents the entire structure of the blower 1 from being overturned.

Referring to FIG. 15, the base 600 may include a lower body 610 that forms one or more of an inner space 610*s*, an upper body 630 that is disposed above the lower body 610 and disposed above the inner space of the lower body 610, and/or a bottom body 620 that is disposed below the lower body 610 and is in contact with the ground.

Referring to FIG. 13, the entire appearance of the lower body 610 may be a bowl shape and the lower body 610 may form the inner space 610*s*. The lower body 610 may include a lower plate 612 and a body outer wall 614 extending obliquely upward from the edge of the lower plate 612.

The overall appearance of the lower plate 612 may be a disk shape. The body outer wall 614 may extend in a circumferential direction and may be inclined outwardly in a radial direction. An electric wire hole 614*a* through which the electric wire 10 passes may be formed on one side of the body outer wall 614.

Referring to FIG. 13, the bottom body 620 may include one or more of a bottom plate 622 that is formed to be in contact with the ground, a support 624 that is disposed on the edge of the bottom plate 622 to prevent the blower 1 from overturning, and a fastening boss 623 that extends upward from the bottom plate 622 and is fastened to the lower plate 612. The bottom plate 622 may be formed to have substantially the same size as the lower plate 612. The support 624 may have a structure inclined toward the floor from the edge of the lower plate 612 to prevent the overall structure of the blower 1 from overturning. The support 624 may be formed in an annular shape at the outer circumferential end of the bottom plate 622.

The support 624 may include an inner support 626 that extends upward from the edge of the bottom plate 622, and an outer support 628 which is inclined downward from the inner support 626. The inner support 626 may be disposed in contact with the edge portion of the lower plate 612 at the upper end portion. The outer support 628 may extend outward in the radial direction, and the outer support 628 may be formed so that the outer circumferential end is in contact with the ground.

Referring to FIG. 15, the upper body 630 may include one or more of an upper plate 632, a rotating shaft housing 636 that is disposed in the center of the upper plate 632 and protrudes toward the rotating plate 500, an edge rib 644 that extends upward from the edge of the upper plate 632, and a base gear 642 that protrudes upward from the upper surface of the upper plate 632 and has a gear formed on one side to engage the driving unit 700.

The upper plate 632 may have a substantially disk shape. In the center of the upper plate 632, a shaft insertion hole 634 open in the up-down direction may be formed. A rotating shaft housing 636 may be disposed around the shaft insertion hole 634.

Referring to FIG. 13, the overall outer shape of the rotary shaft housing 636 may be a cylindrical shape. The rotating shaft housing 636 may provide a space in which the shaft body 530 can be inserted. The rotation shaft housing 636 may be disposed to protrude upward from the upper plate 632. The rotating shaft housing 636 may include an inner circumferential wall 638 forming a space into which the shaft body 530 is inserted, and an inner protrusion 640 protruding radially inward from the lower end of the inner circumferential wall 638.

A shaft bearing 560 may be disposed inside the rotation shaft housing 636. The rotary shaft housing 636 may support the shaft bearing 560 to help prevent the shaft bearing 560 and the shaft body 530 from being detached.

The inner circumferential wall 638 may be disposed to contact the outer circumferential surface of the second layer 564 of the shaft bearing 560. The inner protrusion 640 may support the lower portion of the shaft bearing 560. The upper surface of the inner protrusion 640 may contact the lower surface of the second layer 564 of the shaft bearing 560.

Referring to FIG. 15, the base gear 642 may have a ring shape and may be disposed to protrude upward of the upper plate 632. A center of the base gear 642 may correspond to the same center of the rotation shaft housing 636, and the base gear 642 may have a larger radius than that of the rotation shaft housing 636.

Figure 17:
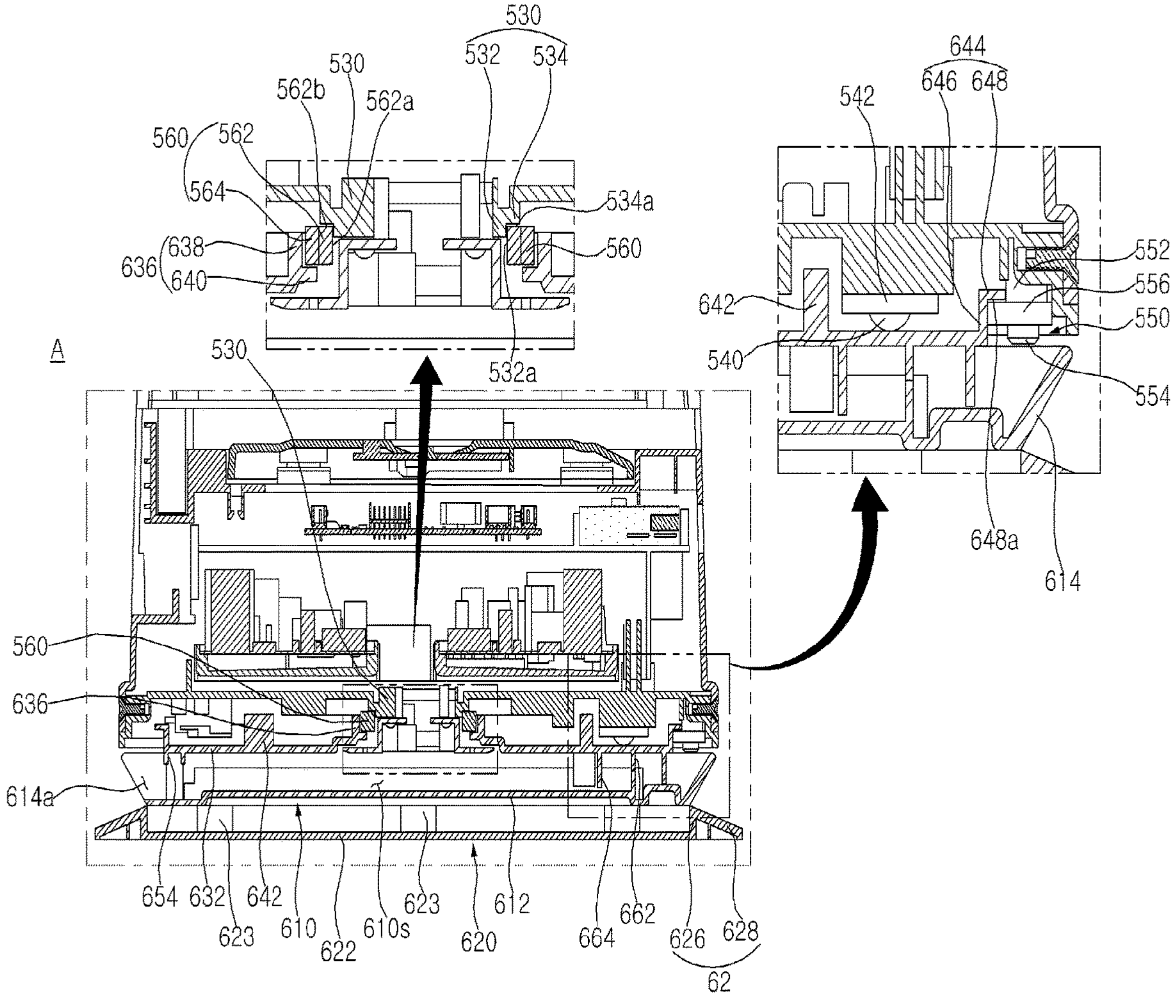
FIG. 17 is a plan view of the base according to an embodiment of the present disclosure.

Referring to FIGS. 15 and 17, the base gear 642 may be formed with a gear engaging with a driving gear 720 of the driving unit 700 (to be described) below along the outer circumferential surface thereof. The base gear 642 may be fixedly disposed on the upper plate 632. Accordingly, the driving gear 720 may rotate along the outer circumferential surface of the base gear 642, and may rotate the rotating plate 500.

Referring to FIG. 13, the base gear 642 may be disposed between the rotation shaft body 530 and the edge rib 644. The base gear 642 may be disposed between the shaft bearing 560 and the ball bearing 540. Referring to FIG. 13, the edge rib 644 may have a structure extending upward from the edge of the upper plate 632. The edge rib 644 may prevent one side of the edge portion of the rotating plate 500 from being lifted upward in contact with the support bearing 550.

The edge rib 644 may include an annular vertical rib 646 that protrudes upward from the outer circumferential end of the upper plate 632, and an outer rib 648 that extends radially outward from the upper end of the vertical rib 646. The outer rib 648 may be disposed above the wheel 556 of the support bearing 550. Accordingly, when one edge of the rotating plate 500 moves upward, the upper surface 556*a* of the wheel 556 of the support bearing 550 and the lower surface 648*a* of the outer rib 648 may contact.

Figure 18A:
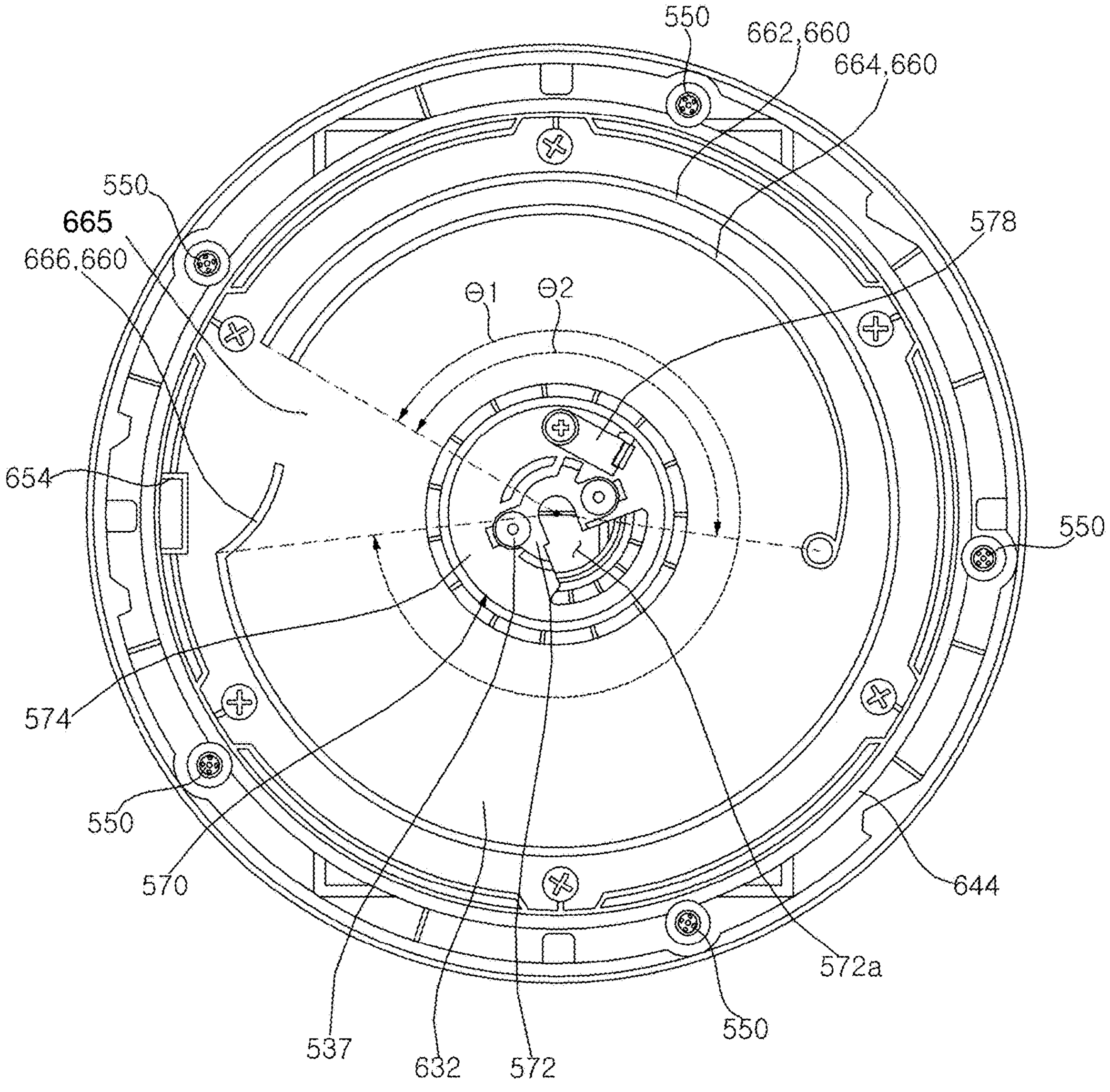
FIG. 18A is a bottom view of a state in which an upper body of the rotating plate and the base are coupled according to a first embodiment of the present disclosure.

Referring to FIGS. 17 to 18A, the upper body 630 may include one or more of a gear support rib 650 that reinforces the rigidity of the base gear 642, a rigid rib 652 that reinforces the rigidity of the upper plate 632, an electric wire fixing protrusion 654 that fixes the electric wires arranged in the electric wire hole 614*a* of the lower body 610, and an electric wire guide rib 660 that prevents interference of the electric wire 10 arranged below the upper plate 632.

The gear support rib 650 may protrude upward from the upper plate 632, and gear support rib 650 may be disposed inside the base gear 642. The gear support rib 650 may be connected to the inner circumferential surface of the base gear 642 to reinforce the rigidity of the base gear 642.

Referring to FIG. 17, the gear support rib 650 may be disposed in a partial region of the inner circumferential surface of the base gear 642. For example, the gear support rib 650 may be disposed inside the base gear 642 in a range in which the driving gear 720 moves by the driving motor 710. However, as another embodiment, the gear support rib 650 may be disposed over the entire area of the inner circumferential surface of the base gear 642.

Referring to FIG. 17, the rigid rib 652 may be disposed above the upper plate 632. The rigid rib 652 may be disposed in a space between the base gear 642 and the rotation shaft housing 636. The rigid rib 652 includes a first rigid rib 652*a* that extends radially from the rotation shaft housing 636, and a second rigid rib 652*b* disposed in a ring shape having a larger radius than that of the rotation shaft housing 636.

Referring to FIG. 13, the electric wire fixing protrusion 654 may protrude to the lower side of the upper plate 632 at a portion where the electric wire hole 614*a* of the lower body 610 is formed. Accordingly, the electric wire fixing protrusion 654 may fix the electric wire passing through the electric wire hole 614*a*. Since the electric wire 10 may also be mounted on the electric wire fixing protrusion 654, the position of the part mounted on the electric wire fixing protrusion 654 may be fixed. Accordingly, the length of the electric wire 10 exposed to the outside through the electric wire hole 614*a* may be prevented from increasing or decreasing.

The electric wire guide rib 660 may be disposed on the lower surface of the upper plate 632. The electric wire guide rib 660 may prevent electric wires disposed between the lower body 610 and the upper body 630 from being disposed to interfere with each other.

One side of the electric wire 10 disposed between the lower body 610 and the upper body 630 may be fixed to the electric wire fixing protrusion 654, and another side of electric wire 10 may be fixed to the electric wire fixing member (or electric wire fixing clamp) 578 of the electric wire holder 570. Accordingly, a length of the electric wire 10 disposed between the lower body 610 and the upper body 630 may be kept constant.

However, as the electric wire holder 570 rotates together with the rotating plate 500, a distance between the electric wire fixing member 578 and the electric wire fixing protrusion 654 of the electric wire holder 570 may vary, and thus, the arrangement of the electric wires 10 arranged between the body 610 and the upper body 630 may be changed during rotation. The electric wire guide rib 660 may fix the arrangement of a portion of the electric wires arranged between the lower body 610 and the upper body 630 to prevent the electric wires from interfering with each other. The electric wire guide rib 660 is disposed to protrude downward from the lower surface of the upper plate 632.

Referring to FIG. 18A, the electric wire guide rib 660 according to the first embodiment may include at least one of an outer guide rib 662, an inner guide rib 664, and an additional rib 666. The outer guide rib 662 may have a ring shape with one side cut off. The outer guide rib 662 may have a cutout area 665 in which the electric wire 10 is disposed adjacent to the electric wire fixing protrusion 654.

The inner guide rib 664 may be spaced apart from the outer guide ribs 662 in a radial direction. The inner guide rib 664 may be formed to be shorter than the outer guide rib 662.

A plurality of the inner guide ribs 664 may be formed in one configuration. The inner guide rib 664 may be divided into a first inner guide rib 664*a* having a constant spacing from the outer guide rib 662, and a second inner guide rib 664*b* having a larger spacing from the outer guide rib 662. The first inner guide rib 664*a* may be disposed in a region adjacent to the electric wire fixing protrusion 654.

The inner guide rib 664 and the outer guide rib 662 may have an arc shape. A central angle $\theta 2$ of the arc formed by the inner guide rib 664 may be smaller than a central angle $\theta 1$ of the arc formed by the outer guide rib 662.

The additional rib 666 may be disposed between the electric wire fixing protrusion 654 and the rotation center of the upper plate 632. The additional rib 666 may extend from one end portion of the outer guide rib 662. The additional rib 666 may extend in a direction in which the inner guide rib 664 is disposed, and may extend in a direction adjacent to the rotation center of the upper plate 632 as it approaches the inner guide rib 664. The additional ribs 666 may prevent contact between the electric wires 10. The additional rib 666 may be disposed between the electric wire fixing protrusion 654 and the center of rotation of the upper plate 632 to prevent a first electric wire extending from the electric wire fixing protrusion 654 and a second electric wire extending into the electric wire holder 570 from contacting each other.

Figure 18B:
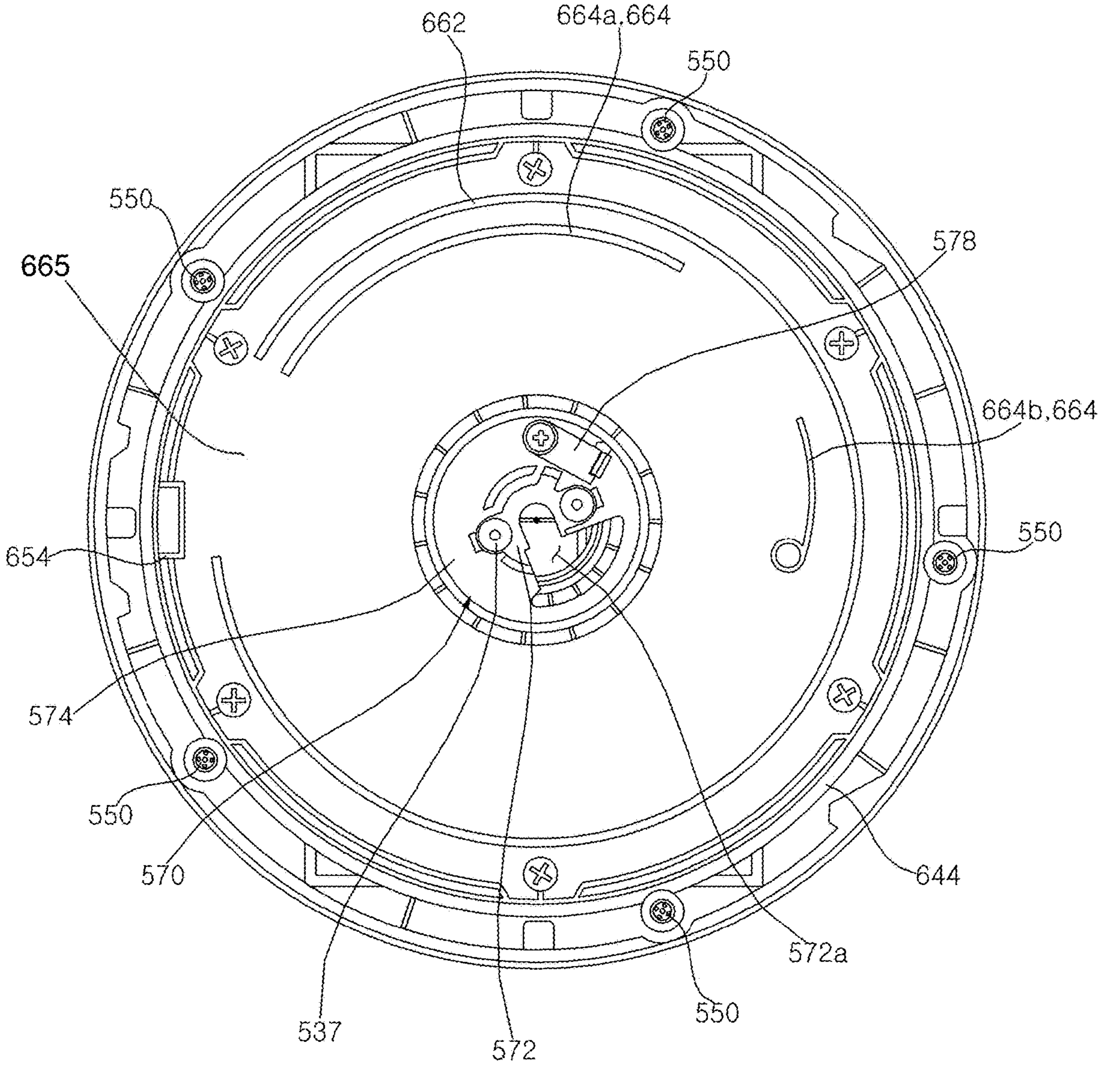
FIG. 18B is a bottom view of a state in which an upper body of the rotating plate and the base are coupled according to a second embodiment of the present disclosure.

Referring to FIG. 18B, the electric wire guide rib 660 according to the second embodiment may include an outer guide rib 662 and an inner guide rib 664. The outer guide rib 662 may have a substantially similar shape as described above with respect to the first embodiment.

A plurality of inner guide ribs 664 may be disposed to be spaced apart from each other in the circumferential direction. The inner guide rib 664 includes the first inner guide rib 664*a* disposed adjacent to the electric wire fixing protrusion 654, and the second inner guide rib 664*b* disposed circumferentially spaced apart from the first inner guide rib 664. The first inner guide rib 664*a* may be formed parallel to the outer guide rib 662. The distance between the first inner guide rib 664*a* and the outer guide rib 662 may be kept constant. Accordingly, a portion of the electric wire disposed between the lower body 610 and the upper body 630 may be fixedly disposed between the outer guide rib 662 and the first inner guide rib 664*a*.

The second inner guide rib 664*b* may extend in a direction closer to the rotation center of the upper plate 632 as the distance from the first inner guide rib 664*a* increases. For example, the distance between the second inner guide rib 664*b* and the outer guide rib 662 may increase in a direction away from the first inner guide ribs 664*a*.

The electric wire holder 570 may be fixed to the rotating plate 500 and may rotate together with the rotating plate 500, and fixes the electric wire 10 from one side. The electric wire holder 570 may include an upper board 572 that is fixed to the rotating plate 500, a lower board 572 that is spaced apart upward from the upper board 572, and a connecting wall that connects the upper board 572 and the lower board 574.

The upper board 572 may be fixed to the shaft body 530 of the rotating plate 500. Referring to FIG. 13, the upper board 572 may be fastened to the fastening part 536 disposed inside the shaft body 530 by a fastening member 537. Accordingly, the electric wire holder 570 may be fixedly disposed on the rotating plate 500, and the electric wire holder 570 may rotate together with the rotating plate 500.

The upper board 572 may have an electric wire through hole 572*a* through which the electric wire passes. A fastening rib 579 coupled to the fastening part 536 may be disposed above the upper board 572. The fastening rib 579 may protrude upward from the upper surface of the upper board 572. The fastening rib 579 may form a groove into which the fastening part 536 is inserted, thereby fixing the disposition of the fastening part 536. When the fastening part 536 is inserted into the groove formed in the fastening rib 579, the fastening part 536 may be fastened to the electric wire holder 570 through a separate fastening member.

Referring to FIG. 15, the fastening rib 579 may include a first fastening rib 579*a* and a second fastening rib 579*b* spaced apart from the first fastening rib 579*a*. A fastening part 536 may be disposed between the first fastening rib 579*a* and the second fastening rib 579*b*.

The first fastening rib 579*a* and the second fastening rib 579*b* may have different shapes according to the structure of the electric wire through hole 572*a*. In another example, the first fastening ribs 579*a* and the second fastening ribs 579*b* may have a symmetrical shape.

The connecting wall may have an approximately cylindrical shape. The connecting wall may extend downward from the outer circumferential end of the upper board 572. The connecting wall may be hollow inside.

The lower board 574 may have a structure extending radially outward from the lower end of the connecting wall. The lower board 574 may be disposed below the upper plate 632. The upper plate 632 may be formed with a groove upward at a portion where the lower board 574 is disposed. The lower surface of the upper plate 632 and the upper surface of the lower board 574 may be disposed to be spaced apart from each other. Accordingly, the electric wire holder 570 may rotate stably without contacting the upper plate 632. An electric wire fixing member 578 that fixes one side of the electric wire 10 may be disposed on the lower side of the lower board 574. The electric wire fixing member 578 may fix the arrangement of the electric wires under the lower board 574.

Figure 19A:
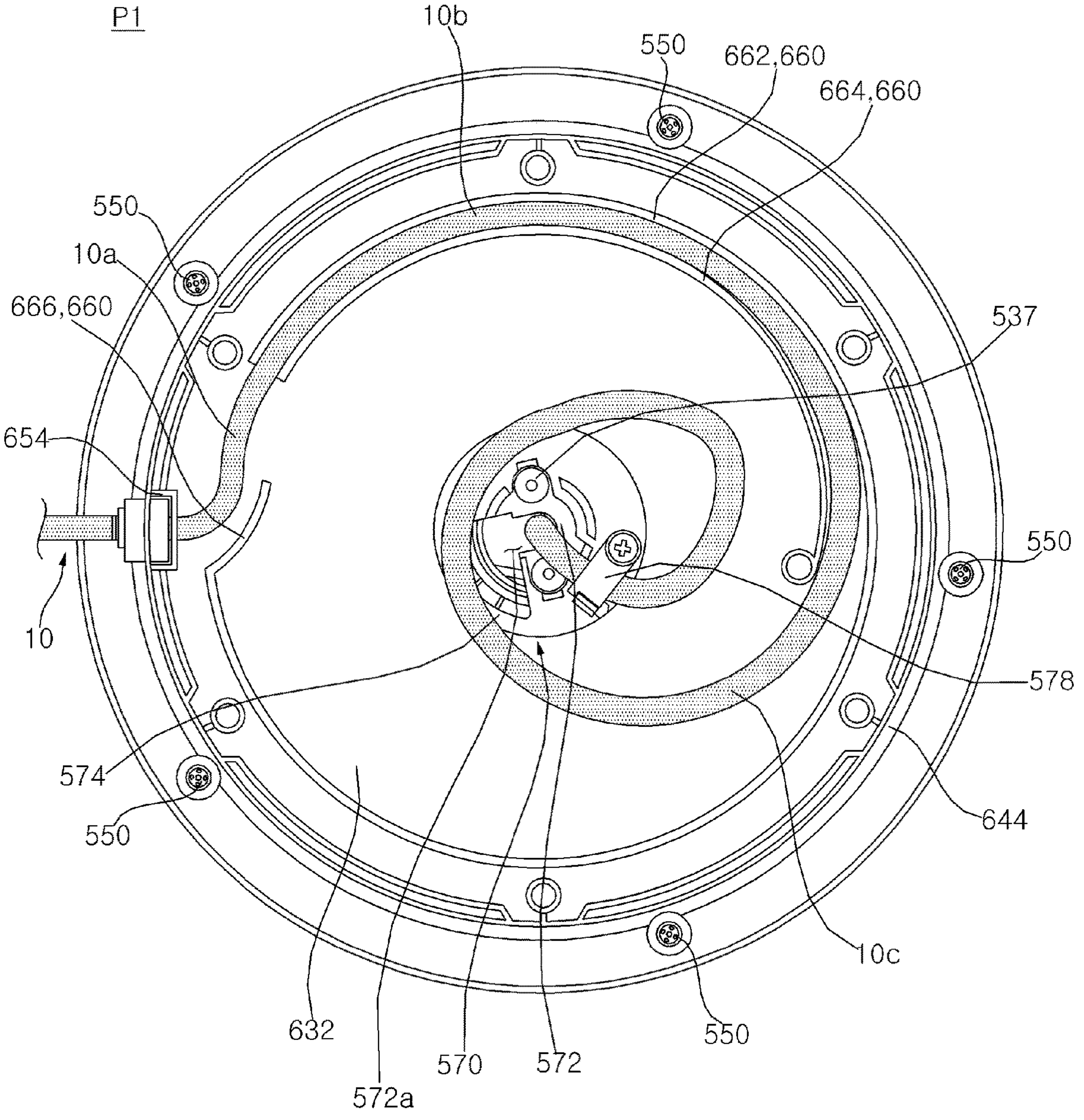
Figure 19B:
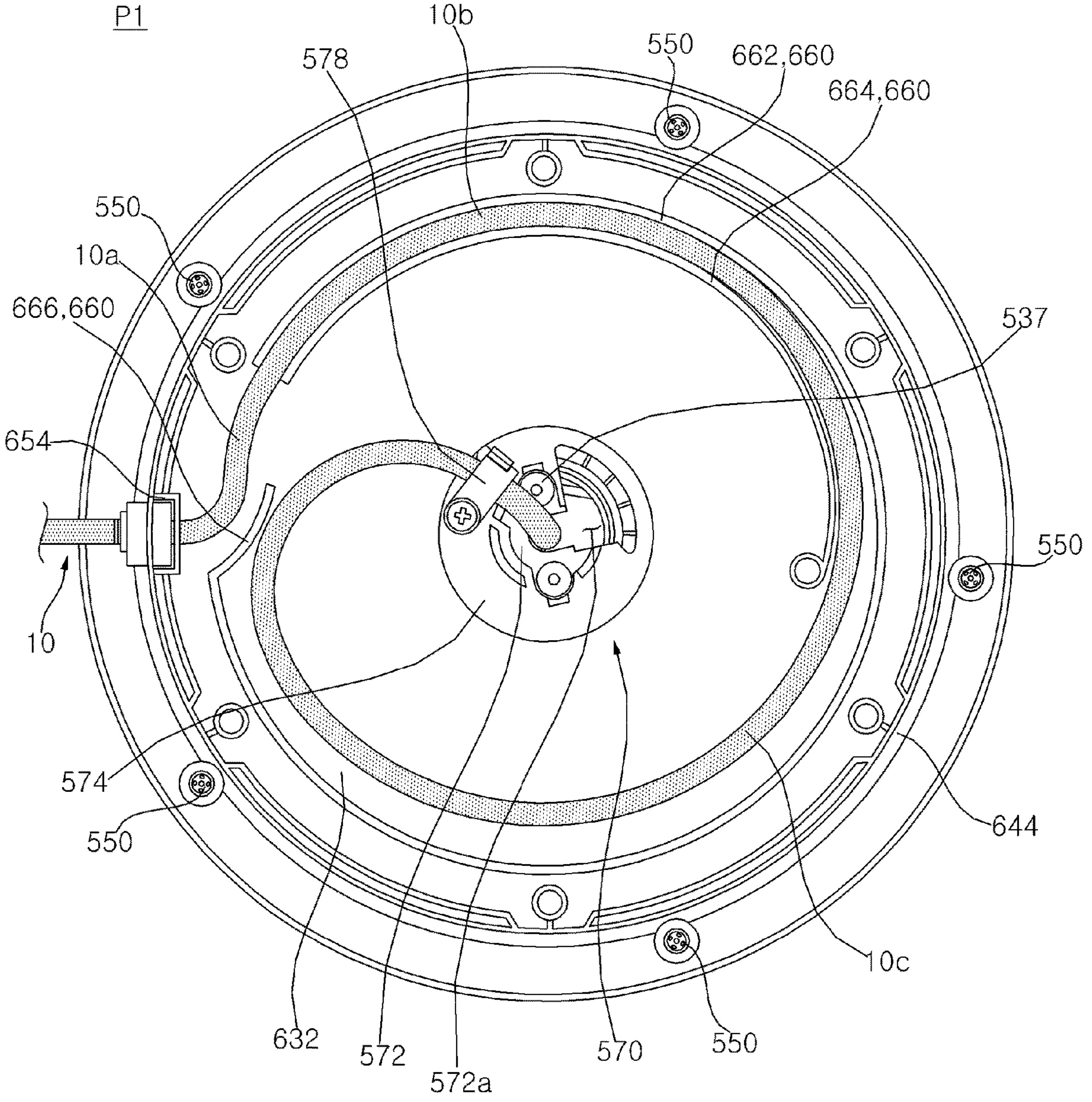

Referring to FIGS. 19A and 19B, the arrangement of the electric wires according to the rotation of the rotating plate 500 will be described. Even if it is disposed in the first position P1 as illustrated in FIG. 19A or the second position P2 as illustrated in FIG. 19B, the positioning of the electric wires 10 disposed between the outer guide rib 662 and the inner guide rib 664 may be substantially fixed.

For example, referring to FIG. 19A, the electric wire 10 disposed between the lower body 610 and the upper body 630 may be divided into a third electric wire (or third electrical wire section) 10*a* that extends from the electric wire fixing protrusion 654 to the outer guide rib 662, a first electric wire (or first electrical wire section) 10*b* that is disposed between the outer guide rib 662 and the inner guide rib 664, and a second electric wire (or second electrical wire section) 10*c* that extends from the first electric wire 10*b* to the electric wire holder 570.

Even if it is disposed at the first position P1 as illustrated in FIG. 19A or the second position P2 as illustrated in FIG. 19B, the positions of the third electric wire 10*a* and the first electric wire 10*b* may be fixed. Referring to FIG. 19A, when the electric wire fixing protrusion 654 and the electric wire fixing member 578 are located at the first position P1 disposed at a distance, the electric wire fixing protrusion 654 and the end portion of the inner guide rib 664 are disposed adjacent to each other. Referring to FIG. 19A, when the electric wire fixing protrusion 654 and the electric wire fixing member 578 are located at the first position P1, the second electric wire 10*c* may be arranged to form a relatively abrupt curvature in the direction in which the inner guide rib 664 is arranged. In this case, the inner guide rib 664 may prevent the second electric wire 10*c* and the first electric wire 10*b* from contacting each other.

Referring to FIG. 19B, when the electric wire fixing protrusion 654 and the electric wire fixing member 578 are located in the second position P2 disposed in a short distance, the electric wire fixing protrusion 654 and the end portion of the inner guide rib 664 may be disposed remotely. Referring to FIG. 19B, when the electric wire fixing protrusion 654 and the electric wire fixing member 578 are located at the second position P2, the second electric wire 10*c* may be arranged to form a relatively gentle curvature in a direction in which the electric wire fixing protrusion 654 is arranged. The additional ribs 666 may prevent the second electric wire 10*c* and the third electric wire 10*a* from contacting each other.

Figure 20:
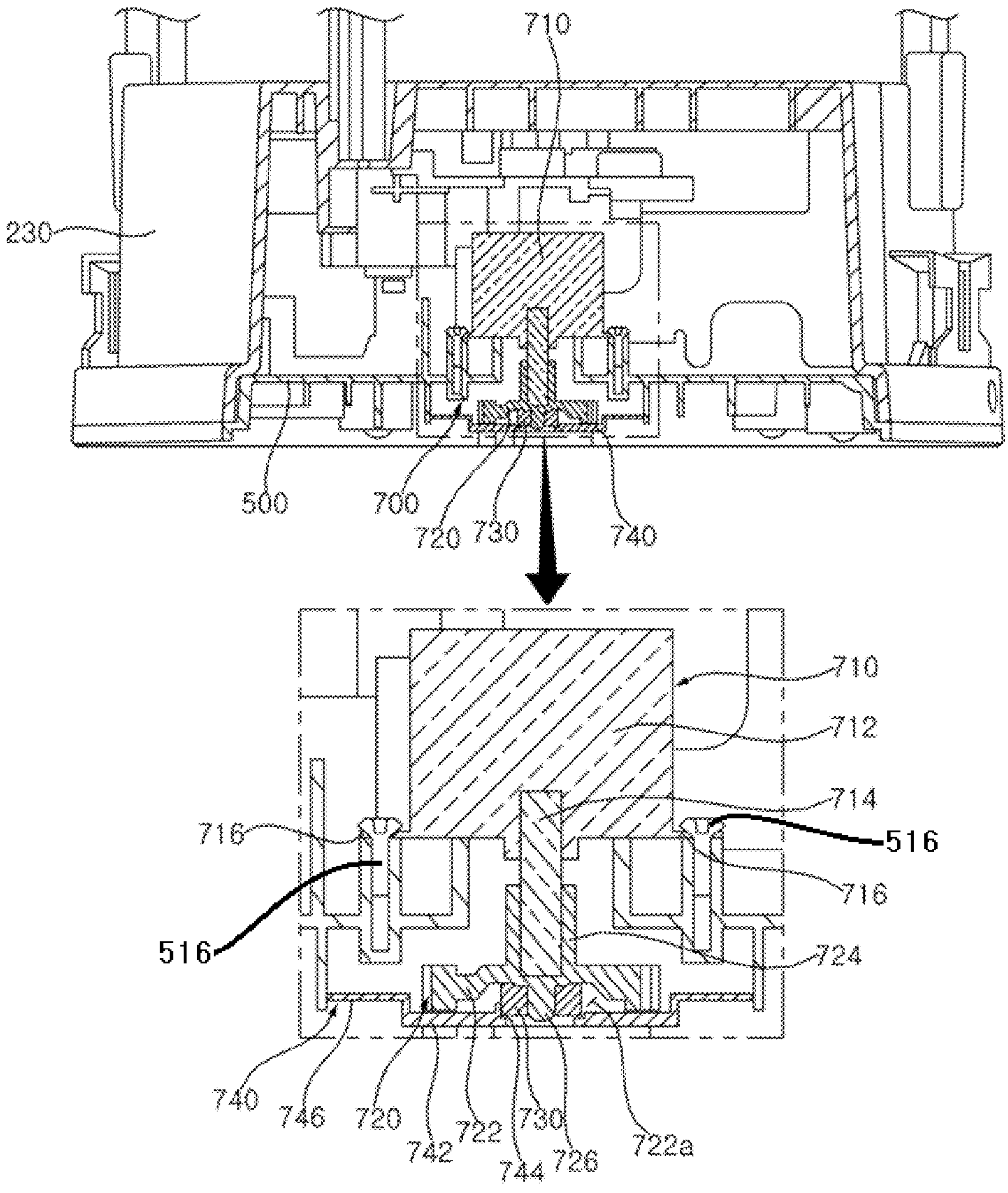
FIG. 20 is a side cross-sectional view for describing a disposition of a driving unit according to an embodiment of the present disclosure.
Figure 21:
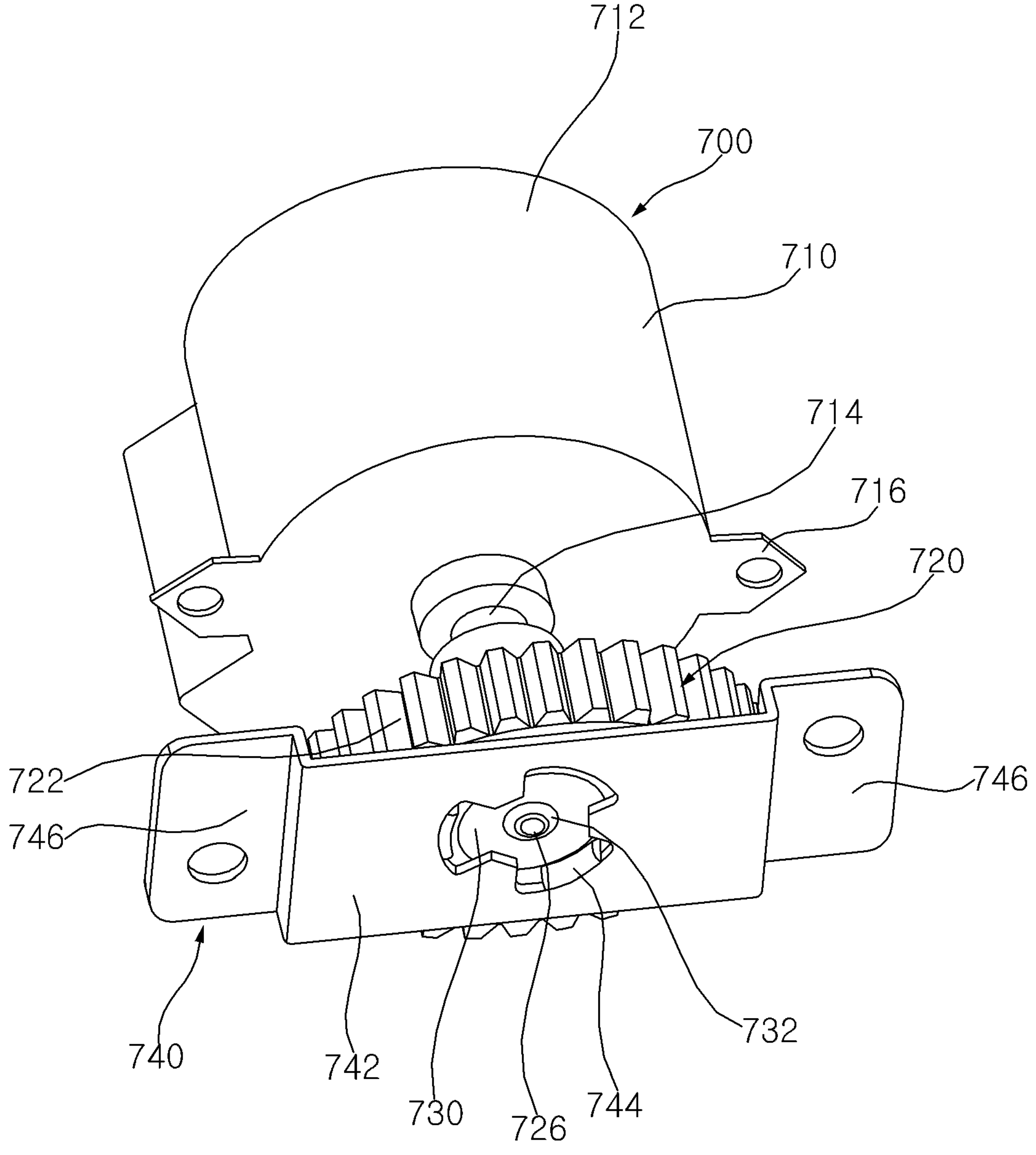
FIG. 21 is a perspective view of the driving unit according to the embodiment of the present disclosure.

Referring to FIG. 20, the driving unit 700 may be disposed above and below the rotating plate 500 to minimize the space occupied by the driving unit 700 inside the blower 1. Referring to FIG. 21, the driving unit 700 may include one or more of a driving motor 710 that generates a driving force and rotates the driving shaft, a driving gear 720 that is connected to the driving shaft 714 to rotate and rotate the rotating plate 500, and/or a bracket 740 that supports the driving shaft 714 The driving unit 700 may be disposed between the driving shaft 714 or the driving gear 720 and the bracket 740, and a gear bearing 30 that maximizes friction between the driving shaft 714 or the driving gear 720 and the bracket 740.

The driving motor 710 may be disposed above the rotating plate 500. A motor groove (not illustrated) open in the up-down direction may be formed in the rotating plate 500. The driving motor 710 may be fixedly disposed on the motor mounting part 514 that is disposed on the rotating plate 500. Accordingly, the driving motor 710 may be fixed to the rotating plate 500 and rotate together with the rotating plate 500. The driving motor 710 may be fixed to the motor mounting unit 514 of the rotating plate 500 and supported by the rotating plate 500. The overall shape of the driving motor 710 may be a cylindrical shape.

The driving motor 710 may include a motor body 712 and a driving shaft 714 that extends from the motor body 712 and is connected to the driving gear 720. The motor body 712 is fixed to the motor fastening part 516. The motor body 712 has a mass cylindrical shape, and a fastening protrusion 716 connected to the motor fastening part 516 is formed on one side.

The driving shaft 714 may rotate while the driving motor 710 operates. A driving gear 720 may be disposed at an end of the driving shaft 714. The driving shaft 714 may be disposed to pass through a motor groove (not illustrated). The driving shaft 714 may have a bar shape with a circular cross section. The driving shaft 714 may have a structure in which a portion has a straight surface at a portion connected to the driving gear 720. The driving shaft 714 may have a polygonal cross-section structure at a portion connected to the driving gear 720. Accordingly, the driving gear 720 may rotate together with the driving shaft 714 while being connected to the end portion of the driving shaft 714.

Figure 22:
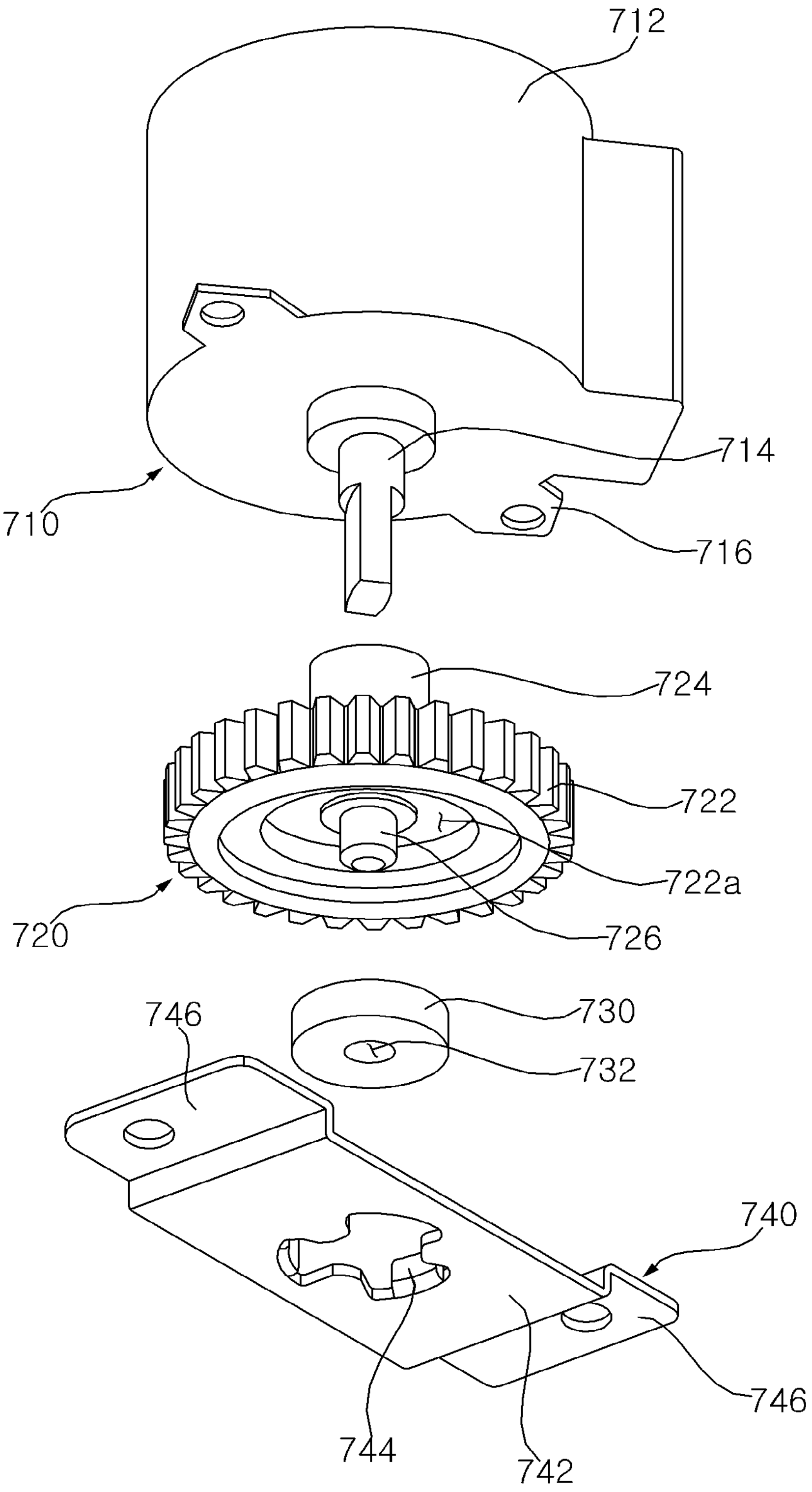
FIG. 22 is a perspective view of the control box according to the embodiment of the present disclosure.
Figure 23:
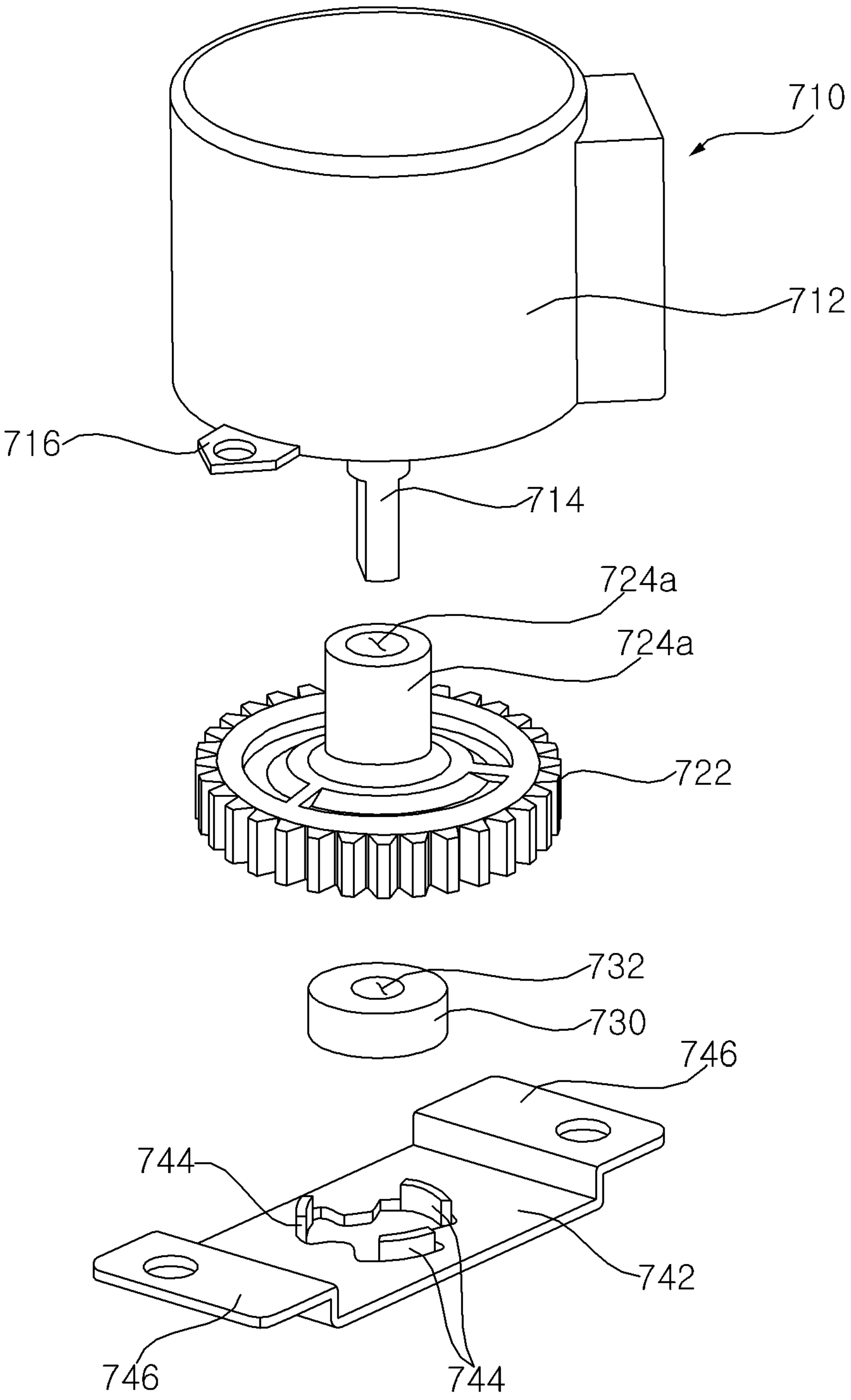
FIG. 23 is a bottom perspective view of FIG. 22.

The driving gear 720 may be disposed below the rotating plate 500. The driving gear 720 may be a spur gear or a pinion gear. Referring to FIGS. 22 and 23, the driving gear 720 may include a gear plate 722 that is formed on the outer peripheral surface and has a disk shape, a gear boss 724 that extends from the center of the gear plate 722 in the direction of the driving motor 710 and has a shaft groove 724*a* into which the driving shaft 714 is inserted is formed, and/or a gear protrusion 726 that extends from the center of the gear plate 722 in the opposite direction to the gear boss 724 and is inserted into the center hole 732 of the gear bearing 730.

The gear boss 724 may be connected to one end of the driving shaft 714 so that the driving gear 720 may rotate together with the driving shaft 714. The cross section of the shaft groove 724*a* formed inside the gear boss 724 may have a substantially same shape as the cross section of the connecting end portion of the driving shaft 714.

The gear plate 722 may have a disk shape, and an outer circumferential surface thereof may have a gear shape engaging with the base gear 642. A bearing groove 722*a* in which the gear bearing 730 is disposed may be formed at a lower portion of the gear plate 722.

The gear bearing 730 may be inserted into the bearing groove 722*a* to rotate. The gear bearing 730 may have a center hole 732 into which the gear protrusion 726 is inserted at the center of rotation.

One side of the gear bearing 730 may contact the driving gear 720, and the other side may contact the bracket 740. The gear bearing 730 may have a structure in which the gear bearing 730 rotates together with the driving gear 720 in a region in contact with the driving gear 720, and gear bearing 730 may be fixed to the bracket 740 in an region in contact with the bracket 740.

The bracket 740 may be fixedly disposed on the rotating plate 500 to support the driving shaft 714. The bracket 740 may directly support the driving shaft 714 or indirectly support the driving shaft 714 through the driving gear 720 and the gear bearing 730.

Referring to FIGS. 22 and 23, the bracket 740 may include a fixing plate 746 that is fixed to the rotating plate 500 and a support plate 742 that supports the driving shaft 714. A pair of fixing plates 746 may be provided at both ends of the support plate 742. The fixing plate 746 may fix the bracket 740 to the rotating plate 500 through a separate fastening member (not illustrated) or the like. Therefore, when the rotating plate 500 rotates, the bracket 740 may also rotate.

The support plate 742 may be disposed between a pair of fixing plates 746. The support plate 742 may form a step at a portion connected to the fixing plate 746 to form a space in which the driving gear 720 is disposed.

The support plate 742 may include a bearing shaft supporter 744 that supports the gear bearing 730 in contact with the outer peripheral surface of the gear bearing 730 and a bearing plate supporter 745 that is disposed under the gear bearing 730 to prevent external separation of the gear bearing 730. The bearing shaft supporter 744 may protrude from the support plate 742 in a direction in which the driving gear 720 is disposed. The bearing shaft supporter 744 may support the driving shaft 714.

The bearing shaft supporter 744 may contact the outer peripheral surface of the gear bearing 730 to prevent the gear bearing 730 from moving. This configuration may prevent the movement of the driving gear 720 and the driving shaft 714 connected through the gear bearing 730.

The bearing plate supporter 745 may be disposed below the gear bearing 730 to prevent the gear bearing 730 from being separated to the outside of the bracket 740. The bearing plate supporter 745 may be disposed to contact the lower surface of the gear bearing 730. The bearing plate supporter 745 is disposed perpendicular to the bearing shaft supporter 744.

When the rotating plate 500 rotates due to the operation of the driving motor 710, the overall structure of the blower 1 may rotate. In addition, when the rotation direction of the rotating plate 500 is changed by the operation of the driving motor 710, as the inertial force of the overall load of the blower 1 is different from the moving direction of the driving motor 710, the driving shaft 714 may be twisted, but the bracket 740 may support the driving shaft 714 to solve the twisting.

The plurality of bearing shaft supporters 744 that are disposed to protrude from the support plate 742 may be provided. The plurality of bearing shaft supporters 744 may be disposed to be spaced apart from each other in the circumferential direction along the outer circumferential surface of the gear bearing 730.

The present disclosure provides a blower that stably supplies power to an electronic device that is disposed inside a rotating blower. The present disclosure provides a blower that prevents twisting of electric wires or interference between the electric wires due to rotation of the blower. The present disclosure provides a blower capable of integrated management of electrical components.

According to the present disclosure, a blower includes a base, a case disposed above the base and provided with an inlet and an outlet, and a rotating plate disposed below the case and rotatably disposed on the base, so the rotating plate and the case may rotate above the base. In addition, the blower may include: an electric wire whose part is exposed to an outside of the base and the other part extends upwards of the rotating plate through the base; and an electric wire holder including an electric wire holder that is fixedly disposed on the rotating plate and fixes one side of the electric wire extending upwards of the rotating plate from an inside of the base, thereby stably maintaining the arrangement of the electric wires extending upwards of the base.

The base may include an electric wire fixing protrusion that fixes the other side of the electric wire extending from an outside to an inner space of the base and an electric wire guide rib that fixes a partial arrangement of the electric wires whose arrangement is changed in an inner space of the base according to a movement of the rotating plate, thereby limiting the movement range of the electric wires whose arrangement is changed inside the base.

The base may include a lower body forming the inner space and an upper body disposed above the inner space, and the electric wire guide rib protruding in a direction of the lower body is disposed on a lower surface of the upper body, thereby fixing the partial arrangement of the electric wires.

The electric wire guide rib may include an outer guide rib limiting a radial outward movement of the electric wires, and an inner guide rib spaced apart from the outer guide rib to fix the partial arrangement of the electric wires. The outer guide rib may form a cutout area in which the electric wires are arranged in an area where the electric wire fixing protrusion is disposed, so an electric wire extending from the outside to the inside of the base may be disposed inside the outer guide rib.

The inner guide rib may include a first inner guide rib spaced apart from the outer guide rib at a regular interval and a second inner guide rib having an enlarged spacing from the outer guide rib, and thus, may have a structure in which the arrangement of the electric wires extending from the outside to the inside of the base is fixed, and the arrangement of the electric wires extending to the electric wire holder is changed.

The second inner guide rib may be disposed to be further spaced apart from the electric wire fixing protrusion than the first inner guide rib, thereby fixing the disposition of the base extending from the outside to the inner space of the base. The first inner guide rib and the second inner guide rib may be spaced apart from each other in a circumferential direction.

The blower may further include an additional rib disposed between the electric wire fixing protrusion and a center of rotation of the rotational plate, thereby preventing the contact between the electric wires whose arrangement is changed in the inner space of the base and the electric wire that extends from the outside to the inside of the base. The additional rib may extend from one end portion of the outer guide rib, thereby partitioning the electric wire extending from the outside to the inner space of the base and the electric wire connected to the electric wire holder.

The electric wire may include a first electric wire fixed to the outer guide rib and the inner guide rib, and a second electric wire extending from the first electric wire to the electric wire holder, and a length of the second electric wire may be longer than that of the first electric wire, thereby increasing a rotation range of the blower.

An electric wire hole through which the electric wire passes may be formed on one side of the lower body, and the electric wire fixing protrusion may be disposed on the upper body at a position where the electric wire hole is formed, thereby fixing one side of the electric wire extending from the outside to the inside of the base.

The electric wire holder may include an upper board fixed to the rotating plate and having an electric wire through hole through which the electric wire penetrates, a lower board spaced downward from the upper board, and a connecting wall connecting the upper board and the lower board, and an electric wire fixing member for fixing one side of the electric wire is disposed on the lower board, thereby stably maintaining the arrangement of the electric wires arranged above the rotating plate since the electric wire fixing member disposed in the inner space of the base rotates even when the rotating plate rotates.

A fastening rib coupled to the rotating plate is disposed above the upper board, and in the electric wire holder, the upper board is coupled to the fastening part with a fastening member in a state where the fastening part is mounted on the fastening rib, thereby integrally rotating the rotating plate and the electric wire holder.

A shaft bearing supporting the rotation of the rotating plate may be disposed between the rotating plate and the bearing, and the electric wire holder may be fastened to the rotating plate inside the shaft bearing, thereby limiting the movement of electric wire extending upwards of the base.

A blower may include: a base; a case disposed above the base and provided with an inlet and an outlet; a fan disposed inside the case and forming a flow of air from the inlet to the outlet; a rotating plate disposed below the case and rotatably disposed on the base; a driving unit mounted on the rotating plate and in contact with the base to relatively rotate the rotating plate with respect to the base; a control device disposed above the rotating plate and electrically connected to the driving unit or the fan; an electric wire whose part is exposed to an outside of the base and the other part disposed above the rotating plate through the base; and an electric wire holder including an upper body that is fixedly disposed on the rotating plate, and a lower body that is disposed in an inner space of the base to fix one side of the electric wire extending upward of the rotating plate, in which the base may includes an electric wire fixing protrusion for fixing the other side of the electric wire extending from the outside to the inner space of the base, an outer guide rib for limiting a radial outward movement of the electric wire, and an inner guide rib spaced apart from the outer guide rib to fix a partial arrangement of the electric wires, thereby limiting the change in the arrangement of the electric wires disposed inside the base.

The electric wire holder may rotate together with the rotating plate, and an electric wire fixing member for fixing one side of the electric wire may be disposed on the lower board, so the arrangement of the electric wires may be changed in the inner space of the base. When the rotating plate rotates, a spacing between the electric wire fixing member and the electric wire fixing protrusion may be changed.

The electric wire holder may include an upper board fixed to the rotating plate and having an electric wire through hole through which the electric wire penetrates and a connecting wall having a hollow pillar shape and connecting the upper board and the lower board, and the electric wire may extend upward through an inner space of the connecting wall.

A blower of the present disclosure has one or more of the following aspects. First, an area where an arrangement of electric wires is changed due to a rotation of the blower is disposed as an inner space of a base, and an area where electronic devices disposed inside the blower are disposed is disposed above a rotating plate rotating on the base, so that even if the blower rotates, electric wires may be stably connected to the device. Second, by disposing an electric wire guide rib, which fixes a partial arrangement of electric wires, in an inner space of a base which is an area where the arrangement of electric wires is changed, it is possible to prevent twisting of the electric wires or contact between the electric wires to prevent malfunction of a blower. In addition, by penetrating the electric wires through a center of an electric wire holder, it is possible to prevent the electric wires from twisting by rotation. Third, it is possible to integrally manage electrical components connected by electric wires by collectively disposing electronic devices above a rotating plate.

The aspects of the present invention are not limited to the above-described effects. That is, other aspects that are not described may be obviously understood by those skilled in the art from the claims.

Although the preferred embodiments of the present disclosure have been illustrated and described above, the present disclosure is not limited to the specific embodiments described above, and can be variously modified by those skilled in the art to which the present disclosure pertains without departing from the gist of the present disclosure claimed in the claims, and these modifications should not be understood individually from the technical ideas or prospects of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A blower comprising:

a base;

a case provided above the base and including an inlet and an outlet;

a rotating plate provided below the case and rotatably provided on the base;

an electric wire that extends from an outside of the base and upwards of the rotating plate through the base; and an electric wire holder fixedly provided on the rotating plate and that fixes a portion of the electric wire extending upwards to the rotating plate from an inner space of the base, wherein the base includes:

an electric wire fixing protrusion that fixes another portion of the electric wire extending from the outside into the inner space of the base, an electric wire guide rib that limits a movement of a part of the electric wire in the inner space of the base including an outer guide rib in a ring shape extended in a circumference direction while surrounding the electric wire holder, and an inner guide rib in an arc shape extended along a part of the outer guide rib, and wherein a first section of the electric wire is the part of the electric wire in the inner space of the base and is disposed between the inner guide rib and the outer guide rib, and a second section of the electric wire is extended from the first section to the electric wire holder and arranged to move in the inner space to form a curvature in a direction in which the inner guide rib is arranged when the rotating plate rotates.

2. The blower of claim 1, wherein:

a length of the second section of the electric wire is longer than a length of the first section of the electric wire.

3. The blower of claim 1, wherein:

the electric wire holder includes:

an upper board fixed to the rotating plate and having an electric wire through hole through which the electric wire passes; and a lower board spaced downward from the upper board, and an electric wire fixing clamp for fixing one side of the electric wire is provided on the lower board.

4. The blower of claim 1, wherein a shaft bearing supporting the rotation of the rotating plate is provided between the rotating plate and the base, and the electric wire holder is fastened to the rotating plate inside the shaft bearing.

5. The blower of claim 1, wherein a distance between the electric wire fixing protrusion and the electric wire holder in a radial direction is greater than a distance between the electric wire fixing protrusion and the electric wire guide rib, and wherein a space is positioned between the electric wire guide rib and the electric wire holder in which the second section is wound and unwound.

6. The blower of claim 1, wherein:

the base includes a lower body forming the inner space, and an upper body provided above the inner space, and the electric wire guide rib protrudes in a direction toward the lower body and is provided on a lower surface of the upper body.

7. The blower of claim 6, wherein an electric wire hole through which the electric wire passes is formed on one side of the lower body, and the electric wire fixing protrusion is provided on the upper body at a position where the electric wire hole is formed.

8. The blower of claim 1, wherein:

the outer guide rib limits a radial outward movement of a third section of the electric wire; and the inner guide rib limits a radial inward movement of the third section of the electric wire, and the inner guide rib is formed to be shorter than the outer guide rib.

9. The blower of claim 1, wherein the outer guide rib forms a cutout area in which the electric wire is disposed adjacent to the electric wire fixing protrusion.

10. The blower of claim 9, further comprising an additional rib extended from one end portion of the outer guide rib toward a point between the electric wire fixing protrusion and a center of rotation of the rotation plate, the additional rib being located near the cutout area.

11. The blower of claim 10, wherein a third section of the electric wire is arranged between the electric wire fixing protrusion and the outer guide rib, and wherein the additional rib is provided between the second section and the third section to prevent the second and third sections from contacting each other when the second section is unwound.

12. The blower of claim 1, wherein the inner guide rib includes a first inner guide rib spaced apart from the outer guide rib at a regular interval and a second inner guide rib having a relatively larger spacing from the outer guide rib than the first inner guide rib.

13. The blower of claim 12, wherein the second inner guide rib is provided to be further spaced apart from the electric wire fixing protrusion than the first inner guide rib.

14. The blower of claim 12, wherein the first inner guide rib and the second inner guide rib are spaced apart from each other in a circumferential direction.

15. A blower comprising:

a base;

a case provided above the base and including an inlet and an outlet;

a fan provided inside the case and generating a flow of air from the inlet to the outlet;

a rotating plate provided below the case and rotatably provided on the base;

a driving motor mounted on the rotating plate and in contact with the base to rotate the rotating plate with respect to the base;

a control device provided above the rotating plate and electrically connected to at least one of the driving motor or the fan;

an electric wire that extends between an outside of the base and above the rotating plate through the base;

an electric wire fixing protrusion provided in the base and fixing a portion of the electric wire extending from the outside into an inner space of the base; and an electric wire holder fixedly provided on the rotating plate to fix another part of the electric wire extending upwards of the rotating plate, and wherein a section of the electric wire between the electric wire fixing protrusion and the electric wire holder is wound and unwound in the inner space while the rotating plate is rotating.

16. The blower of claim 15, wherein the base includes:

an outer guide rib to limit a radial outward movement of the electric wire, and an inner guide rib spaced apart from the outer guide rib to limit a motion of the electric wire during a movement of the rotating plate.

* * * * *